United States Patent
Hoshino et al.

(10) Patent No.: US 11,432,918 B2
(45) Date of Patent: Sep. 6, 2022

(54) ORAL CAVITY WASHING DEVICE

(71) Applicant: PANASONIC INTELLECTUAL PROPERTY MANAGEMENT CO., LTD., Osaka (JP)

(72) Inventors: Junichi Hoshino, Shiga (JP); Tadanobu Kitagawa, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/807,413

(22) Filed: Nov. 8, 2017

(65) Prior Publication Data
US 2018/0140401 A1    May 24, 2018

(30) Foreign Application Priority Data
Nov. 18, 2016 (JP) .............................. JP2016-225538

(51) Int. Cl.
*A61C 17/14* (2006.01)
*A61C 17/02* (2006.01)
(Continued)

(52) U.S. Cl.
CPC .............. *A61C 17/14* (2013.01); *A61C 17/02* (2013.01); *A61C 17/028* (2013.01);
(Continued)

(58) Field of Classification Search
CPC .... A61H 13/00; A61H 13/005; A46B 11/001; A61C 17/0202; A61C 17/227; A61C 17/02–14; A61C 3/02; A61C 3/03
See application file for complete search history.

(56) References Cited

U.S. PATENT DOCUMENTS 3,143,697 A * 8/1964 Springer ................ A61C 17/22
320/115
D246,667 S * 12/1977 Mackay ...................... D24/111
(Continued)

FOREIGN PATENT DOCUMENTS

EP     2 946 748 A1    11/2015
JP     55-134816 U      9/1980
(Continued)

OTHER PUBLICATIONS

The Extended European Search Report dated Mar. 28, 2018 for the related European Patent Application No. 17201114.0.

*Primary Examiner* — Justine R Yu
*Assistant Examiner* — Matthew D Ziegler
(74) *Attorney, Agent, or Firm* — McDermott Will & Emery LLP

(57) ABSTRACT

An oral cavity washing device includes: a body unit including a tank which stores a washing liquid, a pump from which the washing liquid stored in the tank is discharged, and a case formed by joining a plurality of parts to each other so as to accommodate the pump; a tube connected to the body unit so as to make the discharged washing liquid flow through the tube; and a washing unit connected to the tube so as to discharge the washing liquid. The oral cavity washing device includes a seal structure having at least a first seal portion which seals a joint portion between the plurality of parts on an outer shell of the case. With such a configuration, the body unit of the oral cavity washing device can be efficiently washed.

8 Claims, 14 Drawing Sheets

(51) Int. Cl.
*A61C 17/028* (2006.01)
*A61C 17/22* (2006.01)
*A46B 11/00* (2006.01)
*A61C 17/20* (2006.01)

(52) U.S. Cl.
CPC ........... *A61C 17/227* (2013.01); *A46B 11/001* (2013.01); *A61C 17/20* (2013.01)

(56) References Cited

U.S. PATENT DOCUMENTS

| | | | |
|---|---|---|---|
| 4,302,186 A | | 11/1981 | Cammack et al. |
| 4,416,628 A | | 11/1983 | Cammack et al. |
| 4,989,590 A | * | 2/1991 | Baum ................. A61M 3/0258 601/163 |
| 5,086,788 A | * | 2/1992 | Castel ................ A61H 23/0245 601/21 |
| 5,358,150 A | * | 10/1994 | Scheuble ............ A61H 13/005 222/401 |
| 5,399,089 A | * | 3/1995 | Eichman ................ A61C 17/02 433/80 |
| 5,697,784 A | * | 12/1997 | Hafele .................. A61C 17/02 433/100 |
| D406,334 S | * | 3/1999 | Rosenthal .................... D24/111 |
| 6,056,710 A | * | 5/2000 | Bachman ............... A61C 17/02 601/162 |
| 2003/0031979 A1 | * | 2/2003 | Shortt .................... A61C 17/22 433/118 |
| 2012/0045730 A1 | * | 2/2012 | Sayder ................... A61C 17/02 433/29 |
| 2013/0295520 A1 | * | 11/2013 | Hsieh ..................... A61C 17/02 433/89 |
| 2014/0272769 A1 | * | 9/2014 | Luettgen ............ A61C 17/0202 433/27 |
| 2015/0004559 A1 | * | 1/2015 | Luettgen ............... A61H 13/005 433/80 |
| 2015/0173850 A1 | * | 6/2015 | Garrigues ........... A61C 1/0092 433/80 |
| 2015/0182319 A1 | * | 7/2015 | Wagner ............... A61C 17/0202 132/308 |
| 2016/0151133 A1 | | 6/2016 | Luettgen et al. |
| 2017/0209234 A1 | * | 7/2017 | Senff ................... A61C 17/0202 |
| 2018/0153762 A1 | * | 6/2018 | Van Dijk ............ A61M 1/0001 |
| 2018/0168784 A1 | * | 6/2018 | Wagner ............... A61C 17/0202 |
| 2018/0184857 A1 | * | 7/2018 | Pai ....................... A46B 5/0012 |

FOREIGN PATENT DOCUMENTS

| | | |
|---|---|---|
| JP | 55-146114 U | 10/1980 |
| JP | 56-075150 A | 6/1981 |
| JP | 11-342026 A | 12/1999 |
| JP | 2004-041687 A | 2/2004 |
| JP | 2005-349134 A | 12/2005 |
| JP | 2008-119147 A | 5/2008 |
| JP | 2009-072427 A | 4/2009 |
| JP | 2015-217174 A | 12/2015 |

* cited by examiner

ORAL CAVITY WASHING DEVICE

RELATED APPLICATIONS

This application claims the benefit of Japanese Application No. 2016-225538, filed on Nov. 18, 2016, the entire disclosure of which Application is incorporated by reference herein.

BACKGROUND

1. Technical Field

The present disclosure relates to an oral cavity washing device for washing the inside of an oral cavity with a washing liquid.

2. Description of the Related Art

Conventionally, an oral cavity washing device which includes a body unit, a tube, a washing unit and the like is disclosed in Unexamined Japanese Patent Publication No. 2015-217174 or the like, for example (referred to as "PTL 1" hereinafter). The body unit includes a tank for storing a washing liquid, and a pump for discharging the washing liquid. The tube is connected to the body unit, and a washing liquid discharged from the pump flows through the tube. The washing unit includes a washing unit which discharges a washing liquid supplied from the tube. PTL 1 discloses one example of a conventional oral cavity washing device.

In general, the oral cavity washing device can be efficiently washed by washing a body unit with water.

However, with respect to the conventional oral cavity washing device, washing of a body unit with water is not particularly taken into consideration.

SUMMARY

According to an aspect of the present disclosure, an oral cavity washing device includes a body unit including: a tank which stores a washing liquid; a pump from which the washing liquid stored in the tank is discharged; and a case formed by joining a plurality of parts to each other so as to accommodate the pump. The oral cavity washing device further includes: a tube connected to the body unit so as to make the discharged washing liquid flow through the tube; a washing unit connected to the tube so as to discharge the washing liquid; and a seal structure having at least a first seal portion which seals a joint portion between the plurality of parts on an outer shell of the case.

According to the oral cavity washing device of the present disclosure, the body unit can be efficiently washed.

DETAILED DESCRIPTION

Figure 1:
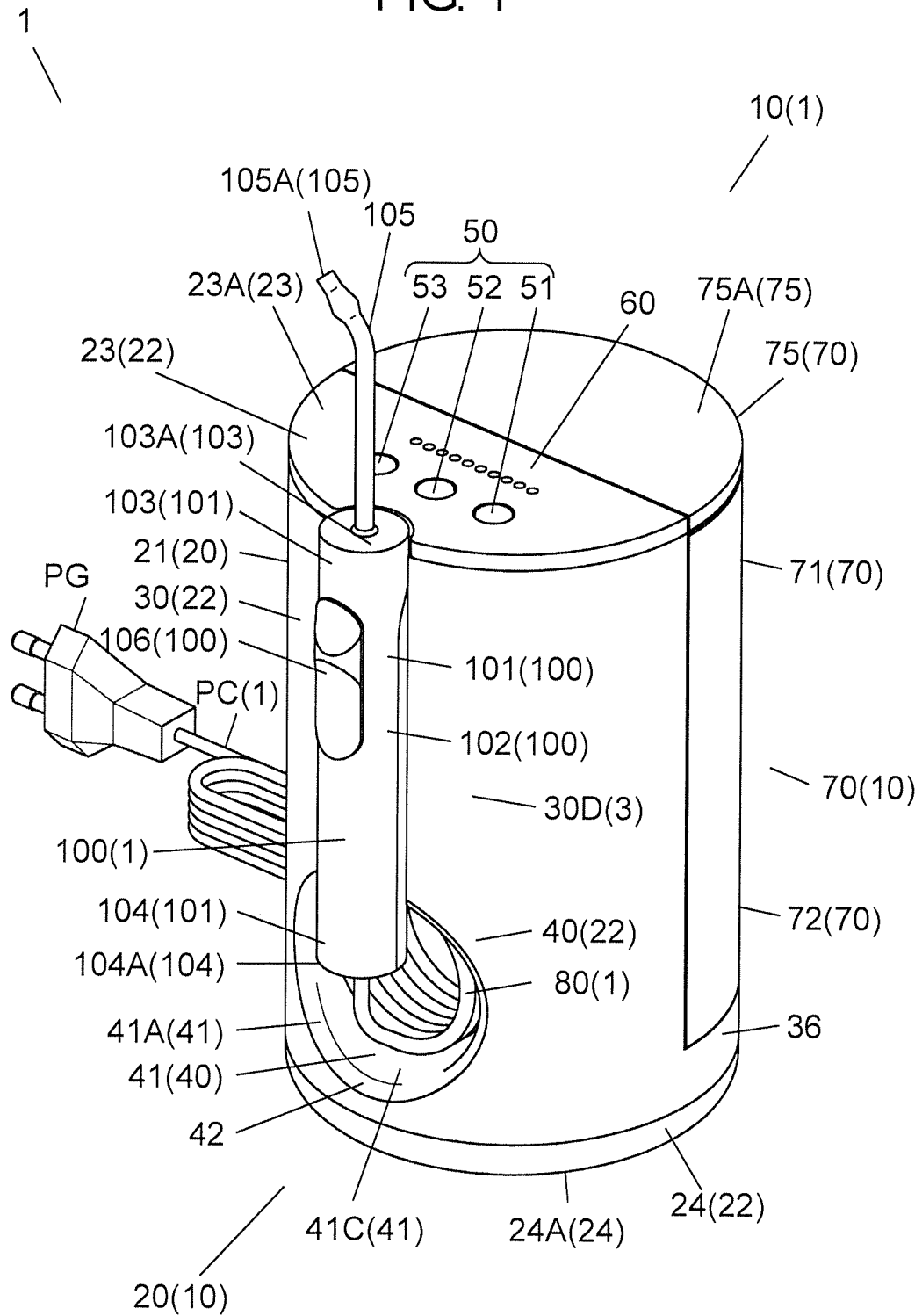
FIG. 1 is a perspective view of an oral cavity washing device of an exemplary embodiment.

One Example of a Mode which an Oral Cavity Washing Device can Adopt

[1] According to an aspect of the present disclosure, an oral cavity washing device includes a body unit including: a tank which stores a washing liquid; a pump from which the washing liquid stored in the tank is discharged; and a case formed by joining a plurality of parts to each other so as to accommodate the pump. The oral cavity washing device further includes: a tube connected to the body unit so as to make the discharged washing liquid flow through the tube; a washing unit connected to the tube so as to discharge the washing liquid; and a seal structure having at least a first seal portion which seals a joint portion between the plurality of parts on an outer shell of the case. With such a configuration, joint portions between the plurality of parts can be sealed. Accordingly, also when the body unit is immersed in water, water minimally enters the inside of the case. As a result, a user can efficiently wash the body unit by immersing the body unit in water.

[2] According to one example of the oral cavity washing device, the oral cavity washing device further includes an operation part which is mounted on the case, and the seal structure further includes a second seal portion which seals a joint portion between the case and the operation part. With such a configuration, an invasion of water into the case of the body unit can be further prevented.

[3] According to one example of the oral cavity washing device, the oral cavity washing device further includes a connecting portion which connects the body unit and the tube to each other, and the seal structure further includes a third seal portion which seals a joint portion between the connecting portion and the body unit. With such a configuration, an invasion of water into the case of the body unit can be further prevented.

[4] According to one example of the oral cavity washing device, the body unit further includes a device body including a pump and a case, and the tank is detachably mounted on the device body and has an outlet through which a washing liquid flows. The device body includes a water supply port which is connected to the outlet of the tank, and the seal structure further includes a fourth seal portion which is provided so as to seal the water supply port of the device body. With such a configuration, an invasion of water into the case of the body unit can be further prevented.

[5] According to one example of the oral cavity washing device, the oral cavity washing device further includes a power source circuit which supplies power to the pump, and the seal structure further includes a fifth seal portion forming a waterproof layer which covers the power source circuit. With such a configuration, a waterproof property of the power source circuit can be further enhanced.

[6] According to one example of the oral cavity washing device, the oral cavity washing device further includes the power source circuit which supplies power to the pump, and a power source cord which supplies power to the power source circuit, and the case includes a lead-out portion through which the power source cord is led out from the inside of the case. The seal structure further includes a sixth seal portion which provides sealing between the case and the power source cord in the lead-out portion. With such a configuration, an invasion of water into the case of the body unit can be further prevented.

[7] According to one example of the oral cavity washing device, the sixth seal portion includes: a bushing which is mounted on the power source cord so as to be inserted into the lead-out portion; and a seal member which provides sealing between the bushing and the lead-out portion. With such a configuration, an invasion of water into the case of the body unit can be further prevented.

Exemplary Embodiment

Hereinafter, a schematic configuration of oral cavity washing device 1 according to an exemplary embodiment is described with reference to FIG. 1.

FIG. 1 is a perspective view showing an external appearance of oral cavity washing device 1 according to the exemplary embodiment. Oral cavity washing device 1 is used for washing the inside of an oral cavity, mainly for washing teeth and gums in the oral cavity. Oral cavity washing device 1 is used in a state where oral cavity washing device 1 is mounted on a flat mounting surface such as a washstand (not shown in the drawing), for example. Oral cavity washing device 1 is driven by electric power supplied from an external power source (not shown in the drawing) such as a commercial power source, and is configured to discharge a washing liquid to the inside of the oral cavity. As one example, the washing liquid is clean water into which detergent is mixed or clean water.

Oral cavity washing device 1 includes body unit 10, tube 80, washing unit 100, and power source cord PC. Body unit 10 includes device body 20 and tank 70. Tank 70 stores a washing liquid. Tank 70 is detachably mounted on device body 20, for example.

Device body 20 accommodates various kinds of elements for driving oral cavity washing device 1. To be more specific, device body 20 includes first case 21 (case), pump 31, motor 32, and power source circuit 33 (see FIG. 7). Pump 31, motor 32, and power source circuit 33 are accommodated in first case 21. Pump 31 discharges a washing liquid stored in tank 70. Motor 32 drives pump 31. Power source circuit 33 supplies power to motor 32. Power source cord PC is electrically connected with power source circuit 33. A plug PG of power source cord PC is connected to an external power source. With such a configuration, power of the external power source is supplied to power source circuit 33 via power source cord PC.

Tube 80 is connected with body unit 10 thus making a washing liquid discharged from pump 31 flow through body unit 10. Washing unit 100 is connected with tube 80, and discharges a washing liquid. Washing unit 100 is detachably mounted on body unit 10. FIG. 1 shows a state where washing unit 100 is mounted on body unit 10. When a user uses washing unit 100 for washing the inside of his or her oral cavity, washing unit 100 is removed from body unit 10.

First case 21 (case) of device body 20 is formed by joining a plurality of parts 22. First case 21 is made of a material such as an acrylonitrile butadiene styrene (ABS) resin. The plurality of parts 22 include an upper lid 23, case body 30, bottom lid 24, and arranging portion 40. Respective parts 22 are respectively formed of individually molded products using a resin material. Upper lid 23, bottom lid 24, and arranging portion 40 are respectively joined to case body 30. Upper lid 23 forms flat upper surface 23A of device body 20.

Tube 80 is formed of a curl tube which is curled in an extensible and shrinkable manner, for example. It is preferable that a kind of a material for forming tube 80, a diameter of tube 80, a wall thickness of tube 80 be determined from a viewpoint of movability of washing unit 100 when washing unit 100 is moved around body unit 10 and also from a viewpoint of durability of tube 80, for example. Tube 80 is made of a material such as an ethylene vinyl acetate copolymer (EVA) having a high flexibility, for example. As one example a diameter of tube 80, it is preferable that the diameter fall within a range of from 3.0 mm to 5.0 mm, for example. To be more specific, the diameter of tube 80 is 4.0 mm as one example. As one example of a wall thickness of tube 80, it is preferable that the wall thickness fall within a range of from 0.5 mm to 1.5 mm, for example. To be more specific, the wall thickness of tube 80 is 1.0 mm as one example.

Washing unit 100 includes second case 101 and nozzle 105. Nozzle 105 is mounted on first end surface 103A of second case 101 so as to discharge a washing liquid. Second case 101 is made of a material such as an ABS resin, for example. Second case 101 includes grip portion 102. Grip portion 102 is configured such that the user can grip washing unit 100 with one hand. Second case 101 includes first end portion 103, and second end portion 104 which forms an end portion on a side opposite to first end portion 103. First end portion 103 includes first end surface 103A. As described above, first end surface 103A is configured such that nozzle 105 can be mounted on first end surface 103A. Second end portion 104 includes second end surface 104A. Tube 80 is inserted into second case 101 from second end surface 104A, for example, and is connected to an inlet of a passage for a washing liquid which is formed in second case 101. Nozzle 105 is connected to an outlet of the passage for a washing liquid.

Washing unit 100 further includes an operation part 106. Operation part 106 is mounted on grip portion 102. Operation part 106 opens and closes a check valve (not shown in the drawing) mounted in second case 101. To be more specific, when the check valve is opened by operating operation part 106, a washing liquid which flows through tube 80 is discharged from discharge port 105A of nozzle 105. On the other hand, when the check valve is closed by operating operation part 106, discharging of the washing liquid from discharge port 105A of nozzle 105 is stopped.

Body unit 10 further includes an operation part 50 and display part 60. Operation part 50 has a function of selecting operations of body unit 10 mainly relating to a discharge of a washing liquid. Operation part 50 is mounted on an upper surface 23A of device body 20, for example.

Operation part 50 includes a plurality of buttons. The plurality of buttons include first button 51, second button 52, and third button 53, and function as follows in response to operations by a user. First button 51 is a button for turning on or off the power source of body unit 10. Second button 52 is a button for increasing a water pressure of a washing liquid discharged from pump 31. Third button 53 is a button for decreasing a water pressure of a washing liquid discharged from pump 31. A water pressure of a washing liquid discharged from pump 31 is regulated by an operation of second button 52 and third button 53 within a range of a discharge pressure of pump 31. To be more specific, it is preferable that a discharge pressure of pump 31 be set to a value which falls within a range of from 3.0 kgf/cm$^2$ to 8.0 kgf/cm$^2$, for example. A water pressure of a washing liquid discharged from discharge port 105A of nozzle 105 changes corresponding to a water pressure of a washing liquid discharged from pump 31.

It is preferable that a maximum discharge pressure of pump 31 be larger than a predetermined maximum discharge pressure. The predetermined maximum discharge pressure is determined based on a relationship with a discharge pressure of pump 31 and a force in which a washing liquid discharged from discharge port 105A of nozzle 105 cleans intraoral soil, for example. It is preferable that one example of a predetermined maximum discharge pressure be set to a value which falls within a range of 4 kgf/cm$^2$ and above. It is more preferable that the predetermined maximum discharge pressure be set to a value which falls within a range of 6 kgf/cm$^2$ and above. It is further more preferable that the predetermined maximum discharge pressure be set to a value which falls within a range of 8 kgf/cm$^2$ or more.

Display part 60 displays various information associated with operations by operation part 50. Display part 60 includes a plurality of light emitting diode (LED) lamps which are mounted on upper surface 23A of device body 20, for example. A lighting state of the respective LED lamps (for example, the number of lighting) is regulated by second button 52 and third button 53 of operation part 50, and a change in level of a water pressure of a washing liquid is indicated by such a lighting state of the respective LED lamps.

Arranging portion 40 is joined to case body 30, and in a state where washing unit 100 is mounted on body unit 10, tube 80 is arranged on arranging portion 40. Arranging portion 40 includes recessed portion 41. Recessed portion 41 is configured to accommodate tube 80. Recessed portion 41 includes an opening 41A which opens toward front surface 30D of case body 30.

Oral cavity washing device 1 according to the exemplary embodiment has the above-mentioned schematic configuration.

Hereinafter, the configuration of oral cavity washing device 1 as viewed from a front surface side is described with reference to FIG. 2.

Figure 2:
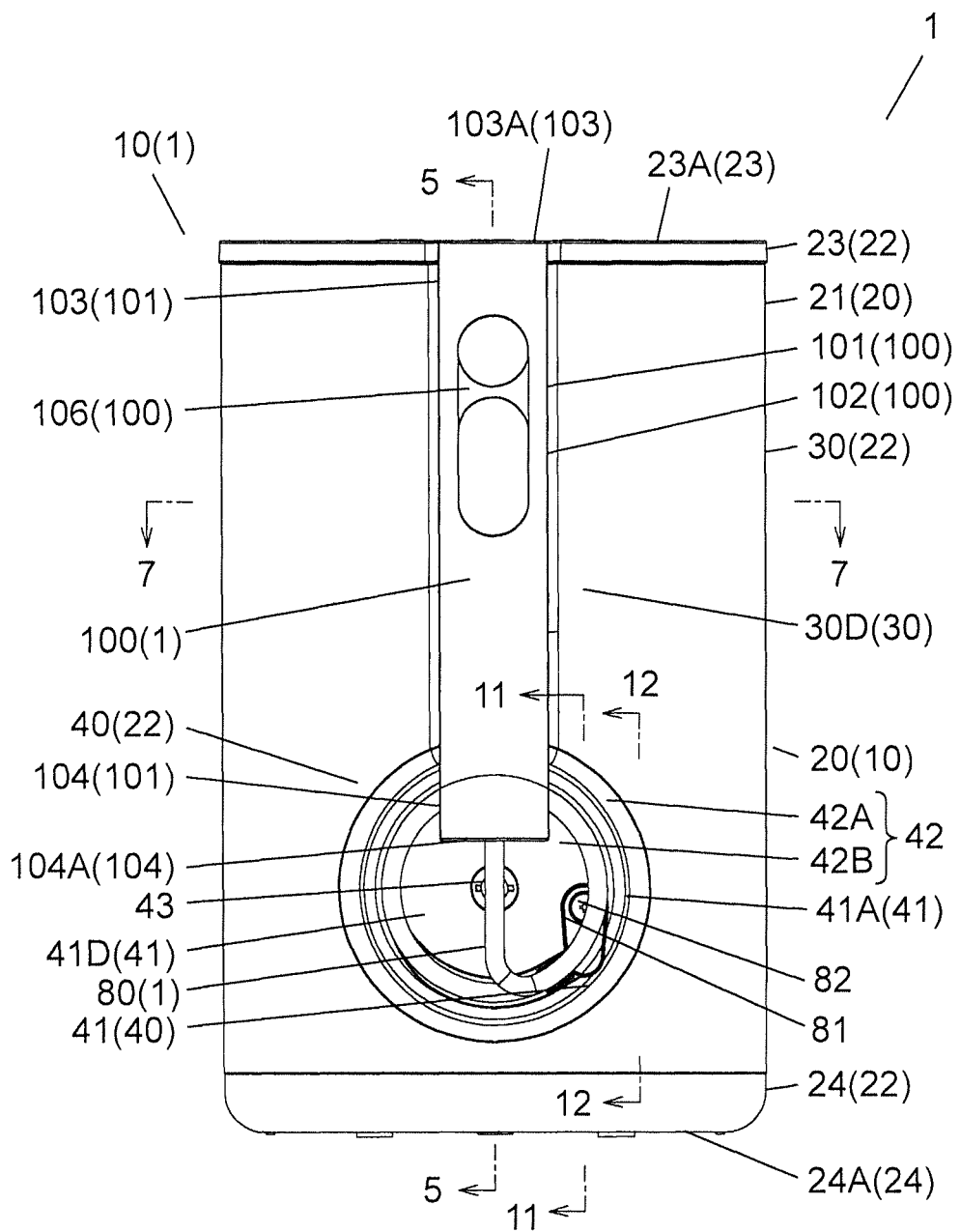
FIG. 2 is a front view of the oral cavity washing device in FIG. 1.

FIG. 2 is a front view of oral cavity washing device 1 showing a state where washing unit 100 where nozzle 105 is removed from second case 101 is mounted on body unit 10.

Second case 101 of washing unit 100 is configured such that second end portion 104 opposedly faces arranging portion 40 in a state where washing unit 100 is mounted on body unit 10. Accordingly, when a user intends to remove washing unit 100 from body unit 10, the user can easily grasp second end portion 104. With such a configuration, the user can easily remove washing unit 100 from body unit 10.

Second case 101 is configured such that first end surface 103A is disposed on substantially the same plane as upper surface 23A of device body 20 in a state where washing unit 100 is mounted on body unit 10. Accordingly, a user can use a positional relationship between first end surface 103A and upper surface 23A of device body 20 as one of marks when the user mounts washing unit 100 on body unit 10. A state where first end surface 103A is disposed on substantially the same plane as upper surface 23A includes a state where a step is not formed between first end surface 103A and upper surface 23A of device body 20, and a state where a small step is formed between first end surface 103A and upper surface 23A of device body 20. The small step means a step of a level that a hand moving around body unit 10 is minimally caught by device body 20 and washing unit 100. That is, the small step means a step of a level which is regarded as not being formed between upper surface 23A of device body 20 and first end surface 103A of washing unit 100 or means a step of a level where upper surface 23A of device body 20 and first end surface 103A of washing unit 100 are regarded as substantially co-planar with each other.

Next, the configuration of oral cavity washing device 1 as viewed in a plan view is described with reference to FIG. 3.

Figure 3:
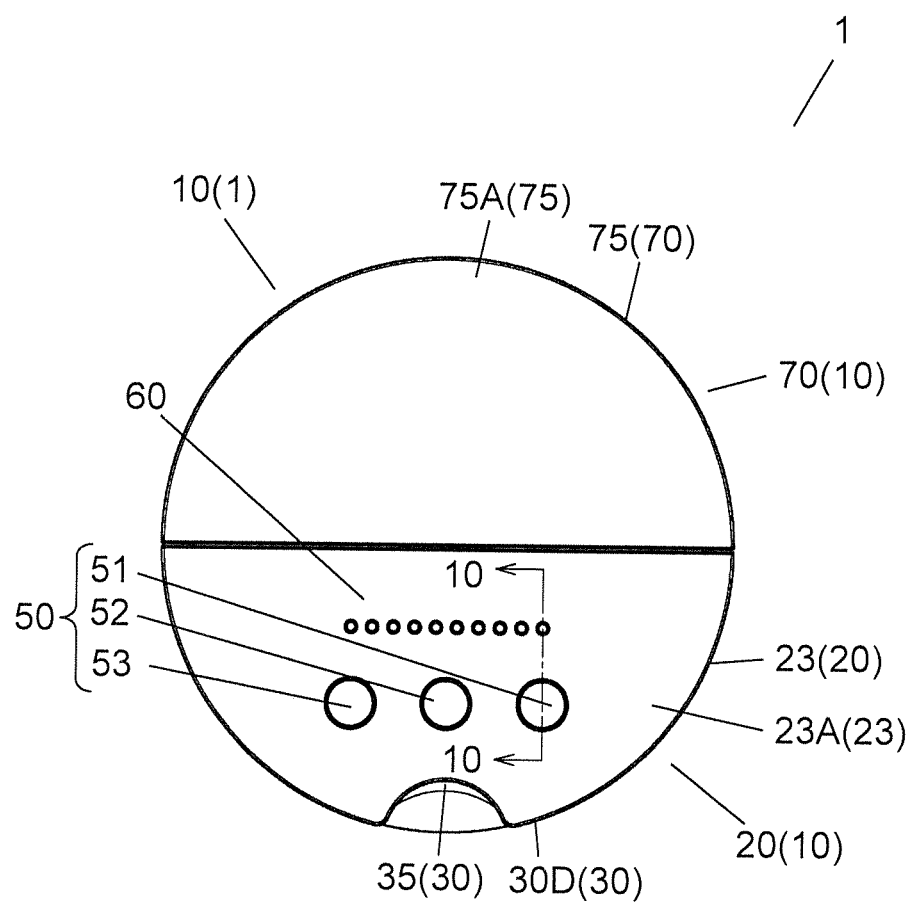
FIG. 3 is a plan view of a body unit in FIG. 1.

FIG. 3 is a plan view of oral cavity washing device 1 in a state where washing unit 100 is omitted.

It is preferable that a two-dimensional shape of body unit 10 be an elliptical shape or an approximately elliptical shape as viewed in a plan view as shown in FIG. 3. A two-dimensional shape of body unit 10 is a two-dimensional shape of body unit 10 in a state where tank 70 is mounted on device body 20. That is, the two-dimensional shape of body unit 10 is equal to a two-dimensional shape of body unit 10 which is projected on a plane perpendicular to a center axis of body unit 10. One example of an elliptical shape of a two-dimensional shape of body unit 10 is a circular shape, for example. When the two-dimensional shape of body unit 10 is an elliptical shape or an approximately elliptical shape, a contact area between body unit 10 and tube 80 in a state where tube 80 (see FIG. 1) is brought into contact with body unit 10 is narrowed.

One example of a two-dimensional shape of tank 70 or device body 20 is a semi-elliptical shape or an approximately semi-elliptical shape as viewed in a plan view. In such a configuration, a two-dimensional shape of device body 20 is a two-dimensional shape of device body 20 in a state where tank 70 is mounted on device body 20.

It is preferable that a three-dimensional shape of body unit 10 be a columnar shape, an approximately columnar shape, a truncated conical shape, an approximately truncated conical shape, a conical shape, an approximately conical shape, a dual conical shape, an approximately dual conical shape, an elliptical shape, or an approximately elliptical shape. In this case, a three-dimensional shape of body unit 10 is a three-dimensional shape of body unit 10 in a state where tank 70 is mounted on device body 20. To be more specific, as shown in FIG. 1, the three-dimensional shape of body unit 10 is an elliptical columnar shape which is one example of a columnar shape. In a case where a three-dimensional shape of body unit 10 is a shape exemplified above, in a state where tube 80 is accommodated in body unit 10, a contact area between body unit 10 and tube 80 is narrowed. In a case where a shape of body unit 10 is a dual conical shape, an approximately dual conical shape, an elliptical shape, or an approximately elliptical shape, it is preferable that a support portion (not shown in the drawing) be formed on a bottom portion of body unit 10. With such a configuration, body unit 10 is mounted on the mounting surface in a stable manner by way of the support portion.

Terms indicating a two-dimensional shape and a three-dimensional shape of body unit 10 are classified into terms not including "approximately" which is a prefix and terms including "approximately" which is a prefix. Terms including "approximately" are an approximately elliptical shape, an approximately columnar shape, an approximately truncated conical shape, an approximately conical shape, an approximately dual conical shape, an approximately elliptical shape, and an approximately semi-elliptical shape, for example. A shape described by a term not including "approximately" is referred to as a basic shape. A shape described by a term including "approximately" is referred to as a similar shape. A similar shape is a shape by which an advantageous effect substantially equal to an advantageous effect acquired in a case where a two-dimensional shape or a three-dimensional shape of body unit 10 is a basic shape can be acquired with respect to narrowing of a contact area between body unit 10 and tube 80. Further, a similar shape includes a shape by which a significant advantageous effect can be acquired compared to a conventional oral cavity washing device where a side surface of a body unit 10 is formed of a flat surface.

As described above, in oral cavity washing device 1 according to the exemplary embodiment, a two-dimensional shape and a three-dimensional shape of body unit 10 as viewed in a plan view are respectively formed into a basic shape or a similar shape. Accordingly, a design property of oral cavity washing device 1 can be enhanced.

A similar shape of a two-dimensional shape includes following various examples such as a first example, a second example, and a third example. To be more specific, a similar shape of a two-dimensional shape in the first example partially includes a straight line. A similar shape of a two-dimensional shape in the second example partially includes a curved line having a center outside the similar shape. A similar shape of a two-dimensional shape in the third example includes characteristics of both the first example and the second example.

The similar shape of the three-dimensional shape includes following various examples such as a first example, a second example, a third example, and a fourth example. A similar shape of a three-dimensional shape in the first example partially includes a flat surface. A similar shape of a three-dimensional shape in the second example partially includes a projecting portion. A similar shape of a three-dimensional shape in the third example partially includes a recessed portion. A similar shape of a three-dimensional shape in the fourth example includes at least two characteristics out of characteristics of the first to third examples.

As shown in FIG. 2, upper surface 23A of device body 20 is positioned on substantially the same plane as flat upper surface 75A (see FIG. 1) of tank 70, for example, in a state where tank 70 (see FIG. 1) is mounted on device body 20. Accordingly, a hand of a user moving around body unit 10, washing unit 100, tube 80 and the like are minimally caught by body unit 10. A state where upper surface 23A is positioned on substantially the same plane as upper surface 75A includes a state where a step is not formed between upper surface 23A of device body 20 and upper surface 75A of tank 70, and a state where a small step is formed between the upper surface 23A of device body 20 and upper surface 75A of tank 70. The small step means a step of a level that a hand of a user moving around body unit 10, washing unit 100, tube 80 and the like are minimally caught by body unit 10. That is, the small step means a step of a level which is regarded as not being formed between upper surface 23A of device body 20 and upper surface 75A of tank 70 or means a step of a level where upper surface 23A of device body 20 and upper surface 75A of tank 70 are regarded as substantially co-planar with each other.

Next, a mounting configuration of washing unit 100 and device body 20 of oral cavity washing device 1 is described with reference to FIG. 4 to FIG. 8.

Figure 4:
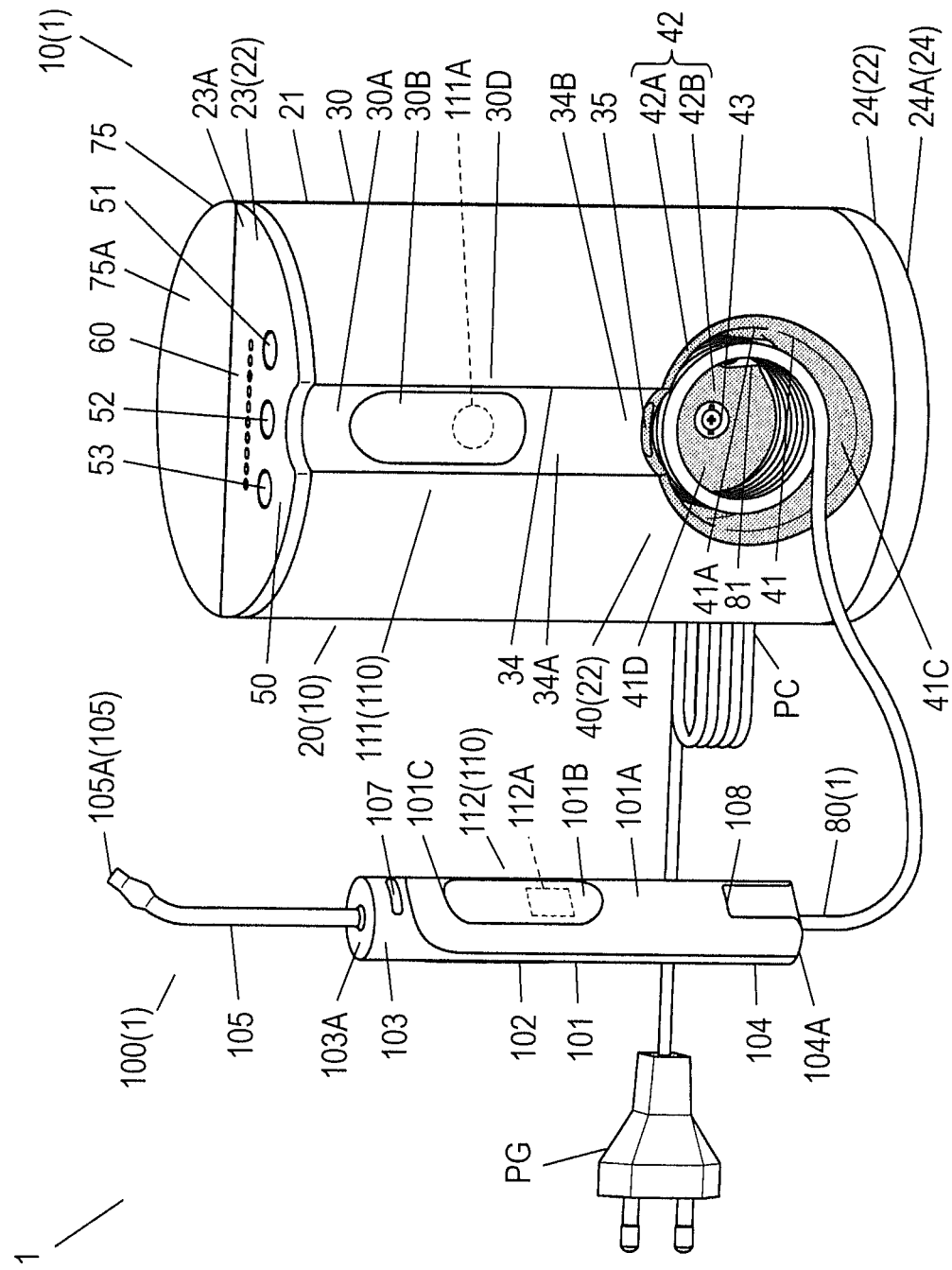
FIG. 4 is a perspective view showing a state where a washing unit is removed from the body unit.
Figure 5:
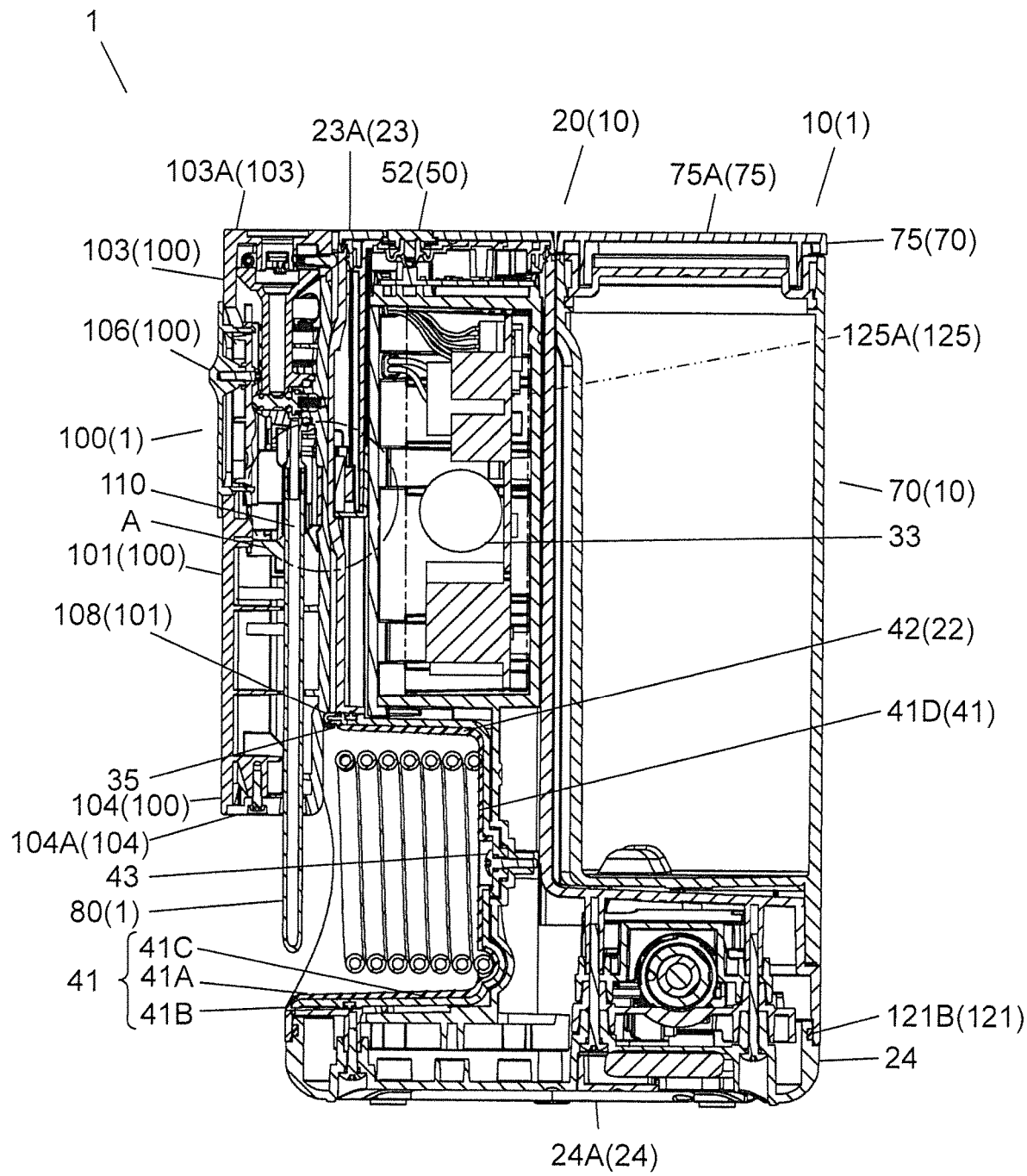
FIG. 5 is a cross-sectional view taken along line 5-5 in FIG. 2.
Figure 6:
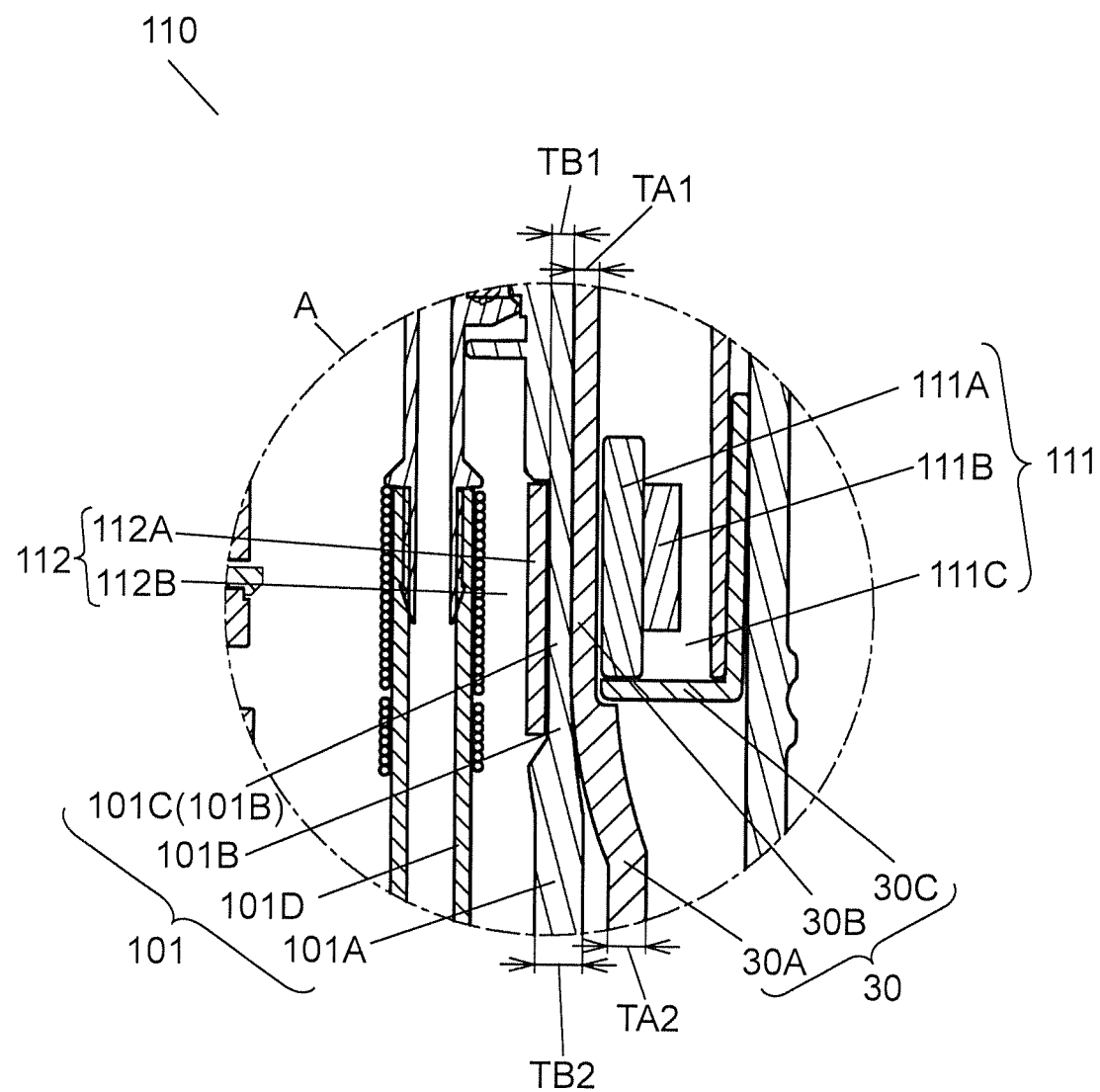
FIG. 6 is an enlarged view of a portion A in FIG. 5.
Figure 7:
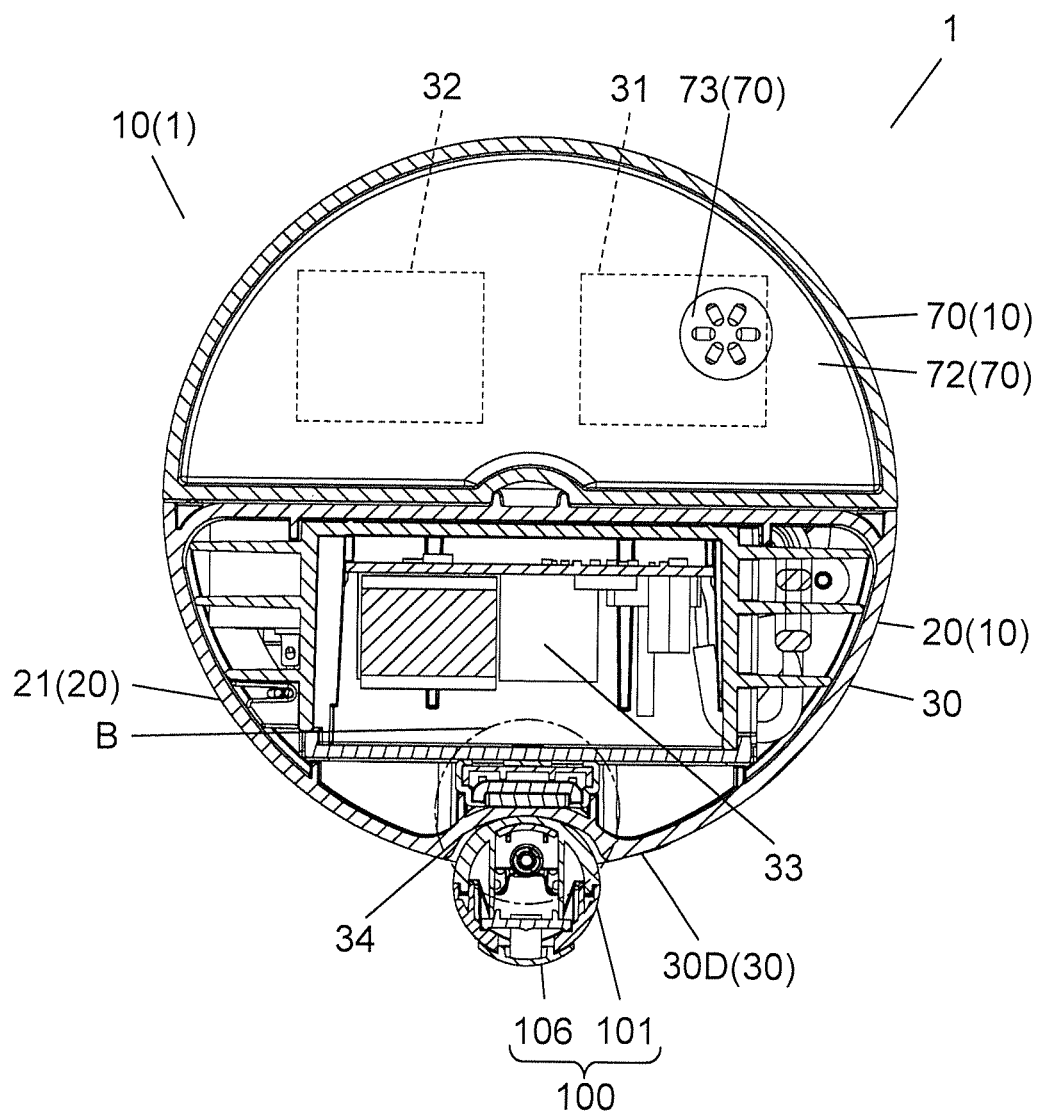
FIG. 7 is a cross-sectional view taken along line 7-7 in FIG. 2.
Figure 8:
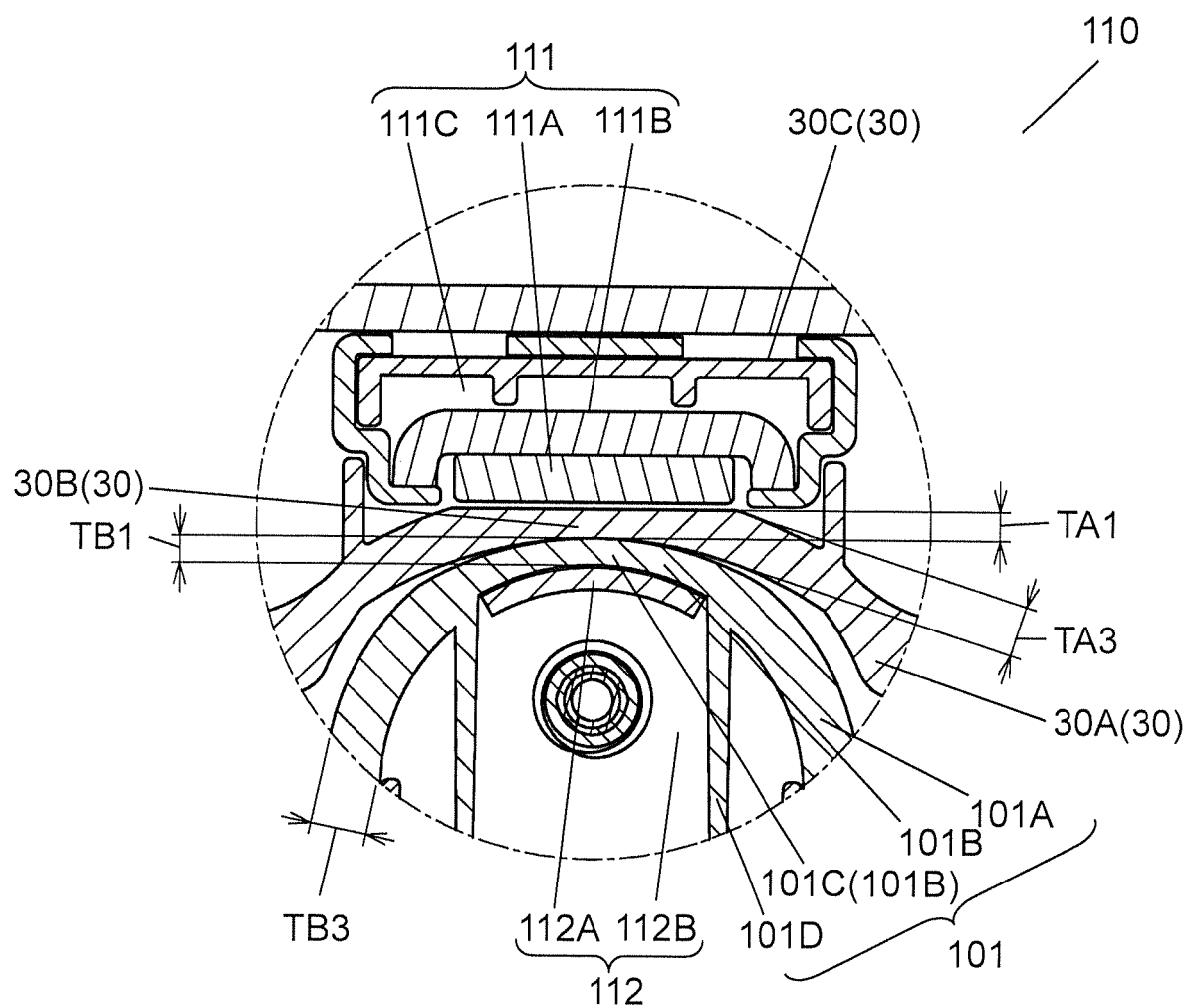
FIG. 8 is an enlarged view of a portion B in FIG. 7.

FIG. 4 is a perspective view showing a state where washing unit 100 is removed from body unit 10. FIG. 5 is a cross-sectional view taken along line 5-5 in FIG. 2. FIG. 6 is an enlarged view of a portion A in FIG. 5. FIG. 7 is a cross-sectional view taken along line 7-7 in FIG. 2. FIG. 8 is an enlarged view of a portion B in FIG. 7.

As shown in FIG. 4, washing unit 100 further includes removing switch 107. Removing switch 107 is pushed when nozzle 105 is removed from second case 101. Removing switch 107 is mounted on a back surface of second case 101 on a side of first end portion 103 (a surface of second case 101 which opposedly faces body unit 10 in a state where washing unit 100 is mounted on body unit 10), for example.

Oral cavity washing device 1 further includes elastic member 42 indicated by dots in FIG. 4. Elastic member 42 is exemplified as a member made of an elastic material such as elastomer, for example and hence, even when elastic member 42 is brought into contact with tube 80, tube 80 is minimally abraded. Elastic member 42 is mounted on arranging portion 40 with which tube 80 is likely to be brought into contact. With such a configuration, when tube 80 is vibrated due to driving of pump 31 (see FIG. 7), elastic member 42 absorbs the vibrations of tube 80. Accordingly, abrasion brought about by a contact vibration between tube 80 and elastic member 42 minimally occurs. Further, noises generated by the vibration can be made small compared to a case where vibrating tube 80 is brought into contact with a portion which is not covered by elastic member 42.

Elastic member 42 includes first elastic member 42A and second elastic member 42B. First elastic member 42A is mounted on an edge 41B of opening 41A of recessed portion 41, for example (see FIG. 5). To be more specific, first elastic member 42A is mounted on whole edge 41B of opening 41A, for example. That is, first elastic member 42A is mounted on edge 41B of opening 41A which may strongly come into friction contact with tube 80. Accordingly, the generation of abrasion of tube 80 can be further decreased. Further, noises generated by the vibration can be made small compared to a case where vibrating tube 80 is brought into contact with a portion which is not covered with first elastic member 42A.

Second elastic member 42B is mounted on an inner peripheral surface 41C and bottom surface 41D of recessed portion 41, for example. To be more specific, second elastic member 42B is mounted on whole inner peripheral surface 41C and whole bottom surface 41D of recessed portion 41, for example. That is, second elastic member 42B is mounted on inner peripheral surface 41C and bottom surface 41D of recessed portion 41, which are easily brought into contact with tube 80. Accordingly, the generation of abrasion of tube 80 can be further suppressed. Further, noises generated by the vibration can be made small compared to a case where vibrating tube 80 is brought into contact with a portion which is not covered by second elastic member 42B.

Oral cavity washing device 1 further includes joining portion 110. In joining portion 110, washing unit 100 is mounted on body unit 10 in a detachable manner. To be more specific, joining portion 110 makes body unit 10 and washing unit 100 joined to each other by a magnetic force. That is, when washing unit 100 is disposed close to body unit 10, washing unit 100 and body unit 10 are joined to each other by a magnetic force of joining portion 110.

Case body 30 further includes recessed portion 34. Recessed portion 34 is disposed so as to open on front surface 30D of case body 30, for example. Recessed portion 34 has a shape corresponding to a shape of the outer shell of washing unit 100. To be more specific, surface 34A of recessed portion 34 forms a space of recessed portion 34, and has a curved surface corresponding to the outer shell of washing unit 100, for example. With such a configuration, in a state where washing unit 100 is joined to body unit 10 by joining portion 110, washing unit 100 is disposed on recessed portion 34 of body unit 10. Accordingly, a posture of washing unit 100 which is joined to body unit 10 is determined by joining portion 110.

Case body 30 includes first outer wall 30A and second outer wall 30B. First outer wall 30A and second outer wall 30B form an outer shell of case body 30. Second outer wall 30B is mounted on a portion of recessed portion 34 of case body 30, for example. Second outer wall 30B is disposed so as to be surrounded by first outer wall 30A. In such a configuration, removing switch 107 which is mounted on the back surface of second case 101 of washing unit 100 forms a gap between back surface of second case 101 and surface 34A of recessed portion 34 in a state where washing unit 100 is mounted on body unit 10. As shown in FIG. 6, second outer wall 30B is formed so as to project to the outside of case body 30 with respect to first outer wall 30A such that the formed gap is gradually decreased.

Joining portion 110 includes first joining portion 111 and second joining portion 112. First joining portion 111 is mounted on front surface 30D of case body 30. To be more specific, first joining portion 111 is mounted on surface 34A of recessed portion 34 of case body 30, for example. First joining portion 111 includes magnet 111A, yoke 111B (see FIG. 6), and first accommodating portion 111C (see FIG. 6). Magnet 111A is made of as a neodymium magnet, for example. Yoke 111B is mounted on magnet 111A on a side opposite to second outer wall 30B of case body 30 (see FIG. 6). With such a configuration, yoke 111B can make a magnetic flux of magnet 111A strongly act on second joining portion 112. Yoke 111B is made of a material such as low carbon steel, for example. First accommodating portion 111C is mounted on case body 30, and accommodates magnet 111A and yoke 111B. First accommodating portion 111C includes second outer wall 30B and an inner wall 30C which is disposed in case body 30 (see FIG. 6).

Recessed portion 34 of case body 30 is formed so as to extend in a height direction of body unit 10, for example. A lower end portion 34B of recessed portion 34 is connected to recessed portion 41 of arranging portion 40. Magnet 111A is mounted on an inner surface (tank 70) side of recessed portion 34 on second outer wall 30B of case body 30. To be more specific, magnet 111A is mounted on the inner surface side of recessed portion 34 in a vicinity of a center in the height direction of recessed portion 34, for example. Accordingly, a force of joining portion 110 for joining washing unit 100 to body unit 10 acts on whole washing unit 100 in a well-balanced manner. With such a configuration, a posture of washing unit 100 which is joined to body unit 10 can be made further stable.

Second case 101 of washing unit 100 includes first outer wall 101A and second outer wall 101B. First outer wall 101A and second outer wall 101B form an outer shell of second case 101. Second outer wall 101B is mounted on a portion of a back surface of second case 101, for example. Second outer wall 101B is surrounded by first outer wall 101A, and is formed on first outer wall 30A in a recessed manner toward inside of second case 101. Second outer wall 101B of second case 101 is formed into a shape fitted to second outer wall 30B of case body 30. With such a configuration, a magnetic force which acts between first joining portion 111 and second joining portion 112 can be increased.

Second joining portion 112 is mounted on washing unit 100. To be more specific, second joining portion 112 is mounted on a back surface of grip portion 102 in a vicinity of an intermediate portion in a height direction (a surface on a side opposite to operation part 106). Second joining portion 112 includes ferromagnetic 112A and second accommodating portion 112B (see FIG. 6). Ferromagnetic 112A is made of a cold rolled steel sheet, for example. Accordingly, in a state where washing unit 100 is removed from body unit 10, second joining portion 112 does not attract a ferromagnetic which exists around oral cavity washing device 1. Ferromagnetic 112A forms second joining portion 112 and hence, a manufacturing cost can be decreased compared to a case where both first joining portion 111 and second joining portion 112 include a magnet. Second accommodating portion 112B includes second outer wall 101B and an inner wall 101D which is disposed in second case 101 (see FIG. 6).

First outer wall 30A of case body 30 includes restricting portion 35. Restricting portion 35 restricts the downward movement of washing unit 100 mounted on body unit 10 with respect to body unit 10. Restricting portion 35 is mounted on lower end portion 34B of recessed portion 34 of case body 30, for example (see FIG. 4). In such a configuration, restricting portion 35 is covered by elastic member 42, for example.

First outer wall 101A of second case 101 includes contact portion 108. Contact portion 108 is mounted on a back surface of second end portion 104 of second case 101, for example. When washing unit 100 moves downward with respect to body unit 10, contact portion 108 is brought into contact with restricting portion 35 of first outer wall 30A of case body 30. That is, also when washing unit 100 joined to body unit 10 moves downward with respect to body unit 10 due to its own weight, contact portion 108 is brought into contact with restricting portion 35. With such a configuration, a position of washing unit 100 in a height direction with respect to body unit 10 is determined.

That is, as shown in FIG. 5, in a state where washing unit 100 is mounted on body unit 10, a position of washing unit 100 with respect to body unit 10 is maintained by joining portion 110 and restricting portion 35. In a state where washing unit 100 is maintained by joining portion 110 and restricting portion 35 with respect to body unit 10, first end surface 103A of second case 101 is disposed on substantially the same plane as upper surface 23A of device body 20.

Next, a relationship between first joining portion 111 and second joining portion 112 is described with reference to FIG. 6.

Magnet 111A of first joining portion 111 is fixed to second outer wall 30B of case body 30 in first accommodating portion 111C. Yoke 111B is mounted on magnet 111A. In such a configuration, thickness TA1 of second outer wall 30B of case body 30 is set smaller than thickness TA2 of a portion of first outer wall 30A of case body 30 around second outer wall 30B in a height direction of body unit 10. Accordingly, a magnetic force which acts between first joining portion 111 and second joining portion 112 can be increased.

Second outer wall 101B of second case 101 includes thin wall portion 101C. Ferromagnetic 112A of second joining portion 112 is fixed to thin wall portion 101C of second outer wall 101B in second accommodating portion 112B. In such a configuration, thickness TB1 of thin wall portion 101C of second outer wall 101B of second case 101 is set smaller than thickness TB2 of a portion of first outer wall 101A of second case 101 around second outer wall 101B in a height direction of washing unit 100. Accordingly, a magnetic force which acts between first joining portion 111 and second joining portion 112 can be increased.

As shown in FIG. 7, washing unit 100 is fitted in recessed portion 34 of case body 30. With such a configuration, washing unit 100 is mounted on body unit 10 in a state where an approximately half of washing unit 100 is embedded in body unit 10, for example. Accordingly, a large projecting portion is minimally formed in a two-dimensional shape of oral cavity washing device 1 as viewed in a plan view. As a result, a design property of oral cavity washing device 1 can be further enhanced.

As shown in FIG. 8, thickness TA1 of second outer wall 30B of case body 30 is set smaller than thickness TA3 of a portion of first outer wall 30A of case body 30 around second outer wall 30B in a width direction of body unit 10. Thickness TB1 of thin wall portion 101C of second outer wall 101B of second case 101 is set smaller than thickness TB3 of a portion of first outer wall 101A of second case 101 around second outer wall 101B in a width direction of washing unit 100. With such a configuration, a magnetic force which acts between first joining portion 111 and second joining portion 112 can be increased.

As described above, washing unit 100 of oral cavity washing device 1 is mounted on device body 20 by a magnetic force generated by way of joining portion 110.

Next, in a configuration of body unit 10 of oral cavity washing device 1, respective elements are individually described with reference to FIG. 9.

Figure 9:
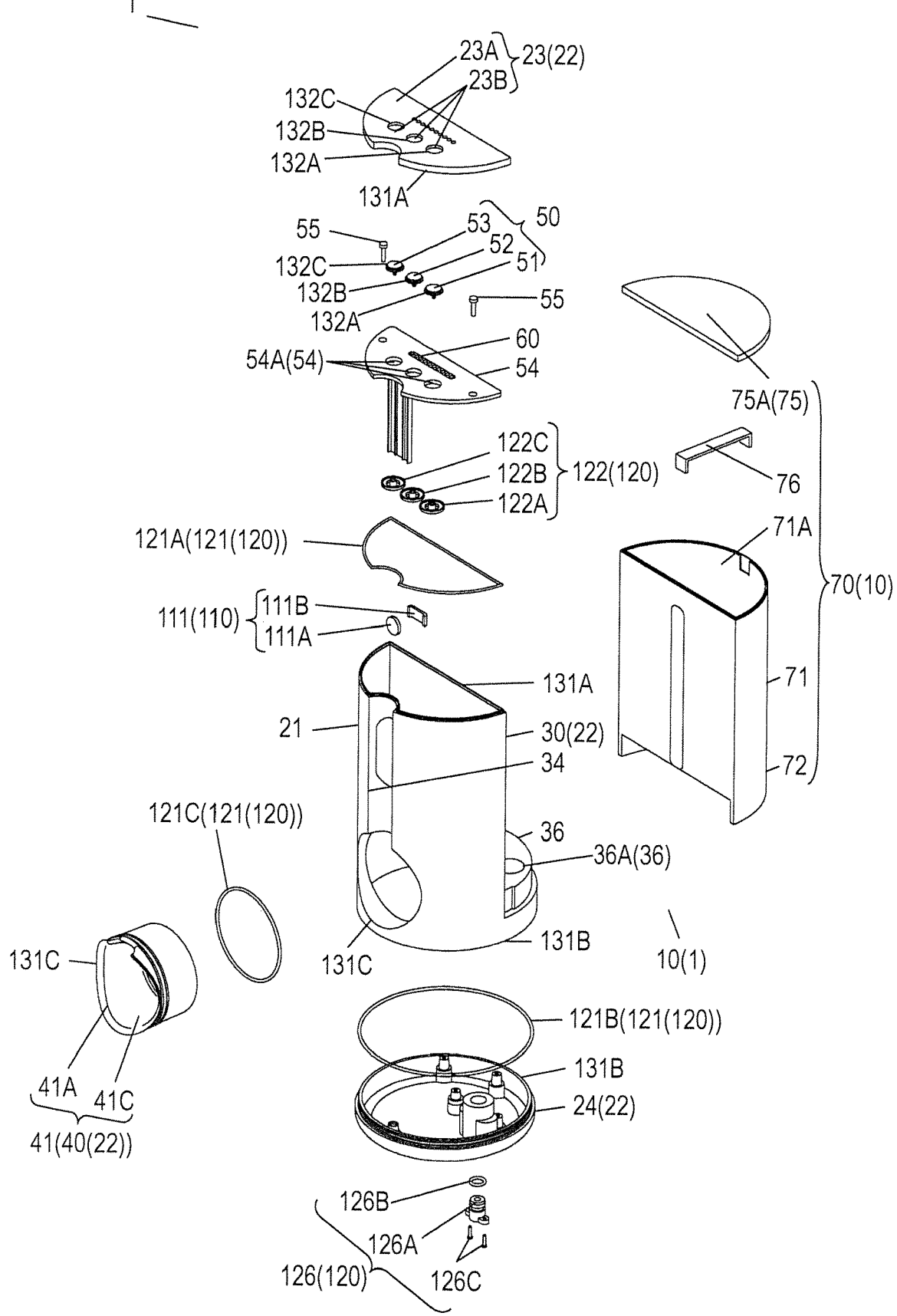
FIG. 9 is an exploded perspective view of the body unit in FIG. 1.

FIG. 9 is an exploded perspective view showing a state where various kinds of elements which form body unit 10 are disassembled. In FIG. 9, the illustration of a portion of body unit 10 is omitted.

First, tank 70 includes tank body 71, bottom portion 72, drain port 73 (see FIG. 7), an outlet 74 (see FIG. 12), lid 75, and handle 76. Tank body 71 is configured to store a washing liquid. A washing liquid is poured into tank body 71 from opening 71A of tank body 71. Bottom portion 72 forms a bottom surface of tank body 71. From drain port 73, a washing liquid stored in tank body 71 is discharged. An amount of a washing liquid to be discharged is regulated by a float valve (not shown in the drawing). Drain port 73 is formed in an inner surface of bottom portion 72. Outlet 74 is formed in an outer surface of bottom portion 72 so as to be communicated with drain port 73. Lid 75 is detachably mounted on tank body 71, and opens and closes opening 71A of tank body 71. Lid 75 forms an upper surface 75A of tank 70 in a state where lid 75 is mounted on tank body 71. Handle 76 is mounted on tank body 71 at a position in a vicinity of opening 71A.

Next, case body 30 includes support portion 36. Support portion 36 supports bottom portion 72 of tank 70. A shape of support portion 36 is a shape similar to shape of tank 70 as viewed in a plan view. Support portion 36 includes water supply port 36A. Water supply port 36A is configured to be connectable with outlet 74 of tank 70. That is, when tank 70 is mounted on device body 20, outlet 74 of tank 70 is connected to water supply port 36A of support portion 36. Water supply port 36A is connected to pump 31. Accordingly, a washing liquid stored in tank 70 is discharged from drain port 73, and is made to flow into pump 31 through outlet 74 and water supply port 36A.

Next, operation part 50 further includes panel 54. First button 51 to third button 53, and display part 60 are mounted on panel 54. Upper lid 23 of first case 21 includes a plurality of holes 23B through which first button 51 to third button 53 are exposed to the outside. Panel 54 includes a plurality of holes 54A into which first button 51 to third button 53 are inserted. After panel 54 is fixed to case body 30 by way of a plurality of screws 55, upper lid 23 is joined to case body 30.

Oral cavity washing device 1 further includes seal structure 120. Seal structure 120 suppresses the invasion of water into first case 21. Seal structure 120 is mounted on first case 21. A protective class of oral cavity washing device 1 is international protection (IP) X7, for example.

Seal structure 120 includes first seal portion 121, and second seal portion 122. First seal portion 121 seals joint portions 131A, 131B, 131C between plurality of parts 22 in the outer shell of first case 21. First seal portion 121 includes first seal member 121A, second seal member 121B, and third seal member 121C.

First seal member 121A seals joint portion 131A between upper lid 23 and case body 30. First seal member 121A is made of a material such as rubber, for example. To be more specific, first seal member 121A is sandwiched between panel 54 of operation part 50 and case body 30, and panel 54 is fixed to case body 30 by screws 55. With such a configuration, first seal member 121A seals joint portion 131A.

Second seal member 121B seals joint portion 131B between bottom lid 24 and case body 30. Second seal member 121B is made of a material such as rubber, for example. To be more specific, second seal member 121B is sandwiched between bottom lid 24 and case body 30, and bottom lid 24 is fixed to case body 30 by screws or the like (not shown in the drawing). With such a configuration, second seal member 121B seals joint portion 131B.

Third seal member 121C seals joint portion 131C between arranging portion 40 and case body 30. Third seal member 121C is made of a material such as rubber, for example. To be more specific, third seal member 121C is sandwiched between arranging portion 40 and case body 30, and arranging portion 40 is fixed to case body 30 by screw 43 (see FIG. 4). With such a configuration, third seal member 121C seals joint portion 131C.

Further, second seal portion 122 seals joint portions 132A, 132B, 132C between first case 21 and operation part 50. Second seal portion 122 includes first seal member 122A, second seal member 122B, and third seal member 122C.

First seal member 122A seals joint portion 132A between upper lid 23 and first button 51. First seal member 122A is made of a material such as rubber, for example. First seal member 122A is provided so as to seal a gap formed between first button 51 which is inserted into hole 54A of panel 54 and panel 54 (see FIG. 10), for example. To be more specific, first seal member 122A is mounted so as to cover a gap formed between first button 51 and panel 54, and upper lid 23 is joined to case body 30. With such a configuration, first seal member 122A seals joint portion 132A.

In the same manner, second seal member 122B seals joint portion 132B between upper lid 23 and second button 52. Third seal member 122C seals joint portion 132C between upper lid 23 and third button 53. Configurations of second seal member 122B and a configuration of third seal member 122C are substantially equal to the configuration of first seal member 122A.

Figure 10:
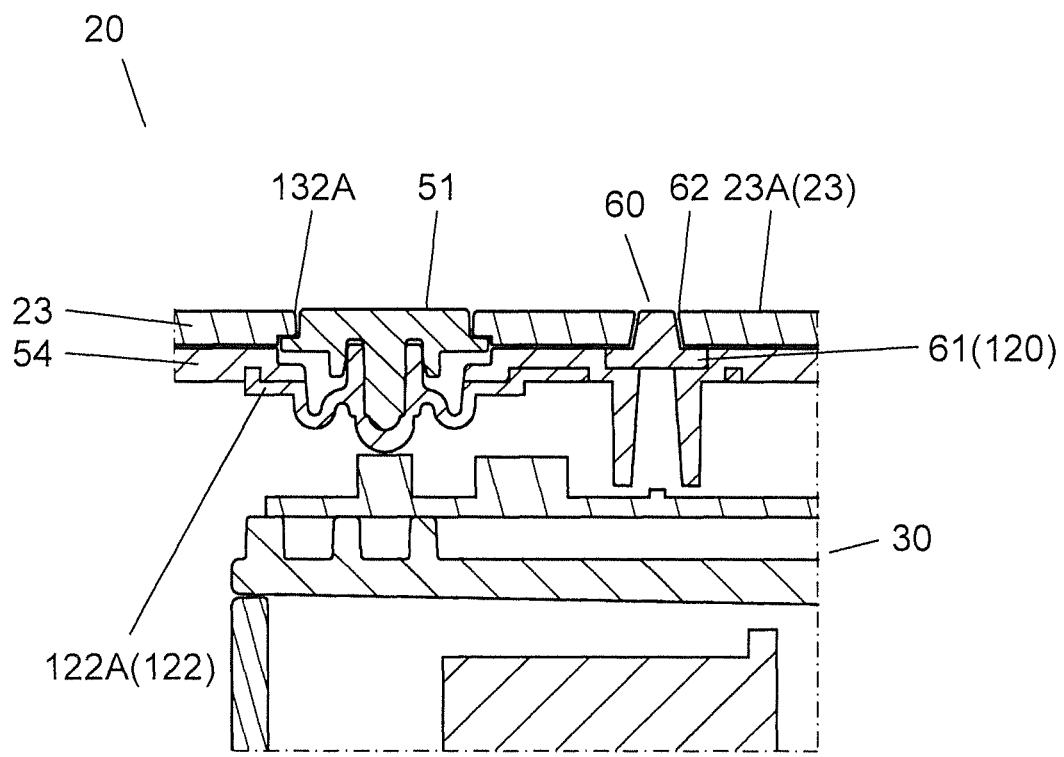
FIG. 10 is a cross-sectional view taken along line 10-10 in FIG. 3.

As shown in FIG. 10, seal structure 120 further includes seal member 61. Seal member 61 seals joint portion 62 between upper lid 23 and display part 60. Seal member 61 is made of a material such as rubber, for example. Seal member 61 covers display part 60 so as to seal display part 60, for example. To be more specific, seal member 61 is mounted so as to cover display part 60, and upper lid 23 is joined to case body 30. With such a configuration, seal member 61 seals joint portion 62. Seal member 61 may be configured to form a portion of second seal portion 122.

Figure 11:
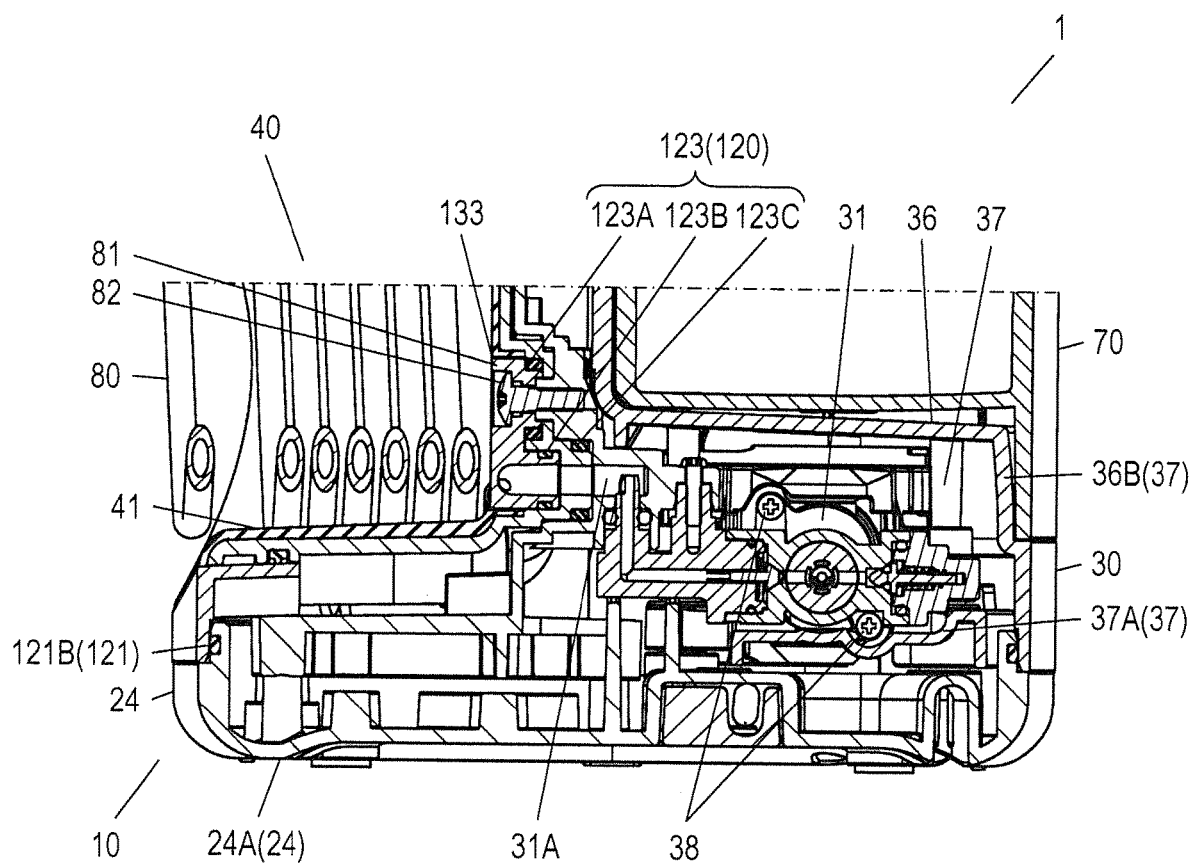
FIG. 11 is a cross-sectional view taken along line 11-11 in FIG. 2.

As shown in FIG. 11, oral cavity washing device 1 further includes connecting portion 81. Connecting portion 81 is a portion where body unit 10 and tube 80 are connected to each other. To be more specific, connecting portion 81 is disposed in recessed portion 41 of arranging portion 40, and forms a connecting portion between case body 30 and tube 80.

Seal structure 120 further includes third seal portion 123. Third seal portion 123 seals joint portion 133 between connecting portion 81 and body unit 10. Third seal portion 123 is formed of elastic member 123A such as an O ring, for example. Elastic member 123A is mounted on arranging portion 40, and seals connecting portion 81. To be more specific, third seal portion 123 is sandwiched between connecting portion 81 and arranging portion 40, and connecting portion 81 is fixed to case body 30 by screw 82 by way of arranging portion 40. With such a configuration, third seal portion 123 seals joint portion 133.

Oral cavity washing device 1 further includes two elastic members 123B, 123C formed of an O ring, for example. Two elastic members 123B, 123C suppress leakage of water from flow passage 31A which connects pump 31 and tube 80 to each other into inside of body unit 10.

Oral cavity washing device 1 further includes pump accommodating portion 37. Pump accommodating portion 37 accommodates pump 31. Pump accommodating portion 37 is formed in support portion 36 of case body 30, for example. Pump accommodating portion 37 is formed by outer wall 36B of support portion 36. Pump accommodating portion 37 includes pump support portion 37A which supports pump 31. Pump accommodating portion 37 and pump support portion 37A form a portion of case body 30. Pump accommodating portion 37 and pump support portion 37A are made of a resin material such as an ABS, for example, in the same manner as the other portions of case body 30. Pump support portion 37A includes ribs (not shown in the drawing) which are formed on an inner surface of outer wall 36B. Ribs fix pump 31 by a joining unit, for example. The joining unit includes fitting structures which are formed on pump 31 and the ribs respectively. The joining unit is a plurality of screws 38, for example.

Figure 12:
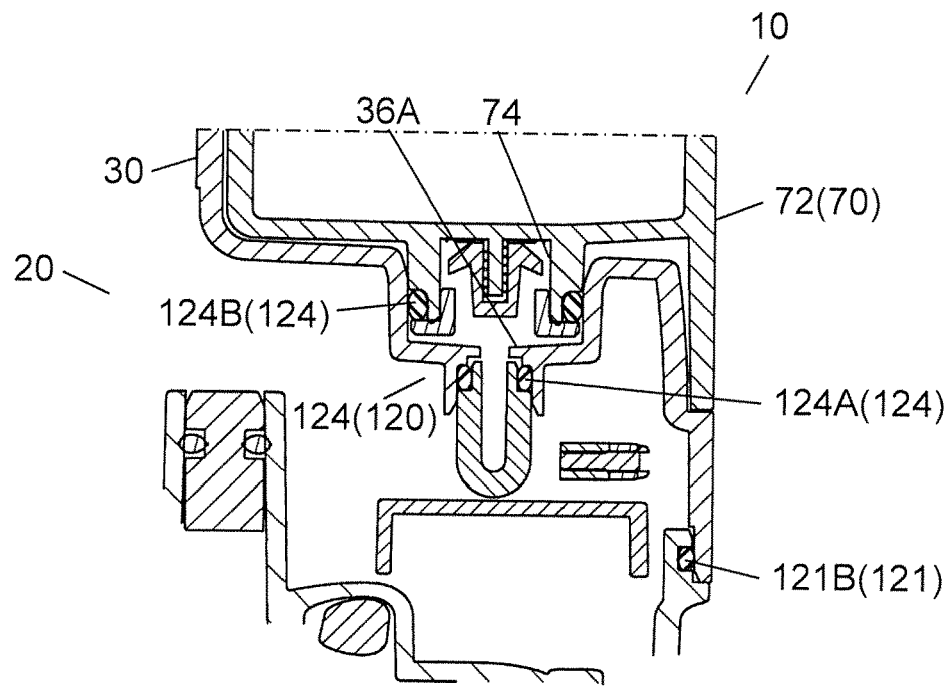
FIG. 12 is a cross-sectional view taken along line 12-12 in FIG. 2.

As shown in FIG. 12, seal structure 120 further includes fourth seal portion 124. Fourth seal portion 124 seals water supply port 36A of case body 30. Fourth seal portion 124 is elastic member 124A such as an O ring, for example. Fourth seal portion 124 is fitted in water supply port 36A. With such a configuration, fourth seal portion 124 seals water supply port 36A. Accordingly, also in a state where when tank 70 is removed from device body 20, water minimally enters the inside of body unit 10.

Oral cavity washing device 1 further includes elastic member 124B. Elastic member 124B is formed of an O ring, for example, and provides sealing between outlet 74 of tank 70 and water supply port 36A of case body 30. Elastic member 124B is fixed to a periphery of outlet 74 of tank 70. With such a configuration, elastic member 124B suppresses leakage of a washing liquid discharged from outlet 74 of tank 70 to the outside in a state where tank 70 is mounted on device body 20.

As shown in FIG. 5, seal structure 120 further includes fifth seal portion 125. Fifth seal portion 125 forms waterproof layer 125A indicated by a double-dashed chain line in FIG. 5. Waterproof layer 125A covers power source circuit 33. Waterproof layer 125A is formed of a resin layer made of a urethane resin, for example, which is formed by potting, for example. With such a configuration, a waterproof property of power source circuit 33 can be further enhanced.

Figure 13:
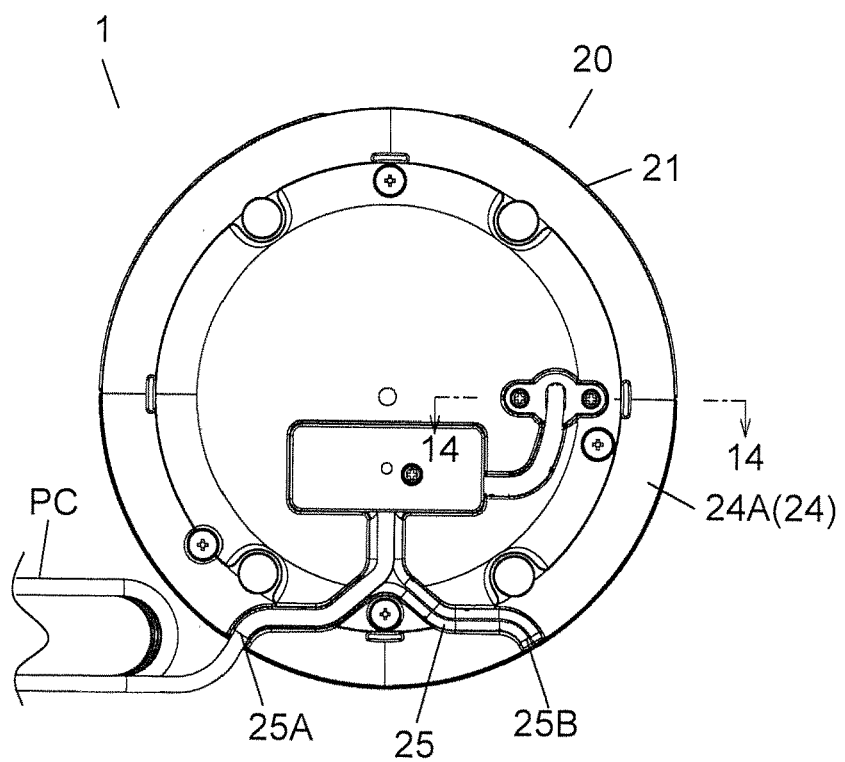
FIG. 13 is a bottom view of the body unit in FIG. 1.

As shown in FIG. 13, device body 20 further includes wiring passage 25. Wiring passage 25 forms a passage for holding power source cord PC led out from the inside of first case 21. Wiring passage 25 is disposed on bottom surface 24A of bottom lid 24. In this exemplary embodiment, wiring passage 25 is disposed in a bifurcated manner, for example. Wiring passage 25 includes first outlet 25A and second outlet 25B. First outlet 25A and second outlet 25B are portions where power source cords PC are led out from device body 20. First outlet 25A and second outlet 25B are disposed in line symmetry with respect to a center line of device body 20 in a width direction. First outlet 25A and second outlet 25B are disposed on side of bottom lid 24, for example. FIG. 13 shows an example where power source cord PC is led out from first outlet 25A. With such a configuration, installation of oral cavity washing device 1 is minimally restricted by power source cord PC.

Figure 14:
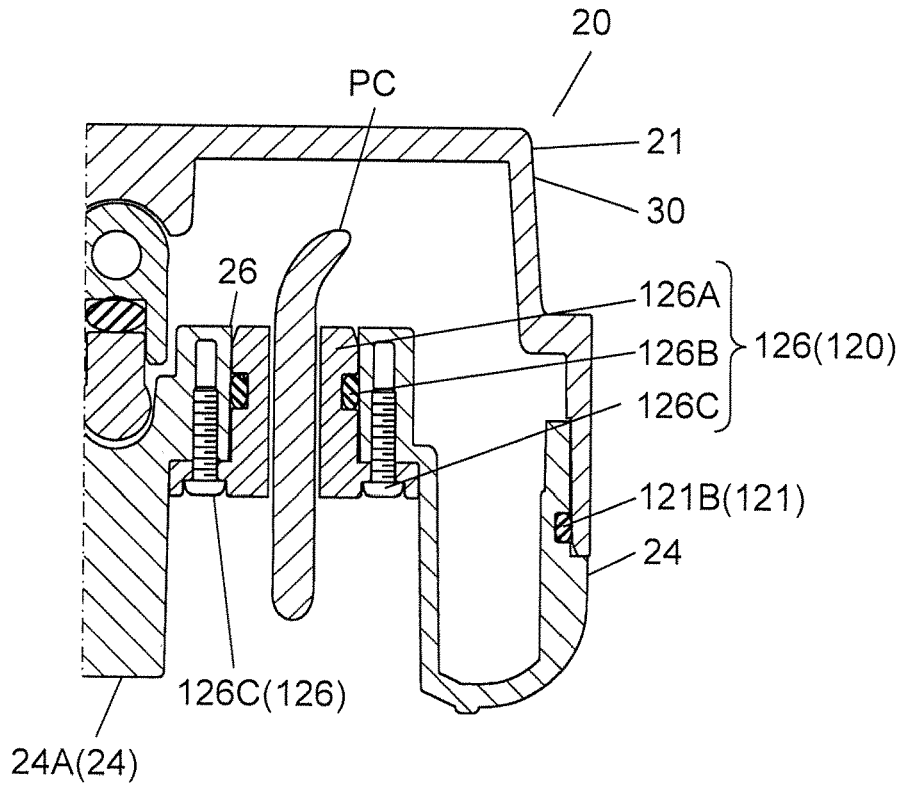
FIG. 14 is a cross-sectional view taken along line 14-14 in FIG. 13.

As shown in FIG. 14, device body 20 further includes lead-out portion 26. Lead-out portion 26 is a portion through which power source cord PC is led out from the inside of first case 21. Lead-out portion 26 is formed on bottom surface 24A of bottom lid 24.

Seal structure 120 further includes sixth seal portion 126. Sixth seal portion 126 provides sealing between bottom lid 24 and power source cord PC in lead-out portion 26. Sixth seal portion 126 includes bushing 126A and seal member 126B. Bushing 126A is provided to power source cord PC such that bushing 126A can be inserted into lead-out portion 26. Bushing 126A is integrally formed with power source cord PC, for example. Seal member 126B is formed of an O ring, for example. To be more specific, seal member 126B is sandwiched between bushing 126A and lead-out portion 26, and bushing 126A is fixed to bottom lid 24 by screws 126C. With such a configuration, seal member 126B provides sealing between bushing 126A and lead-out portion 26. Seal structure 120 satisfies a protective class of IPX7 by including first seal portion 121 to sixth seal portion 126. Accordingly, also when body unit 10 is immersed in water, water minimally enters the inside of body unit 10. As a result, a user can efficiently wash body unit 10.

The respective elements constituting body unit 10 of oral cavity washing device 1 are formed as described above.

Hereinafter, one example of steps of using oral cavity washing device 1 is described with reference to FIG. 1.

Oral cavity washing device 1 is used by a user as follows, for example.

In a first step, a user pours a predetermined amount of washing liquid in tank 70, and mounts tank 70 on device body 20.

In a second step, the user turns on the power source of oral cavity washing device 1 by operating first button 51 of body unit 10. With such an operation, pump 31 (see FIG. 7) starts to drive.

In a third step, the user removes washing unit 100 from body unit 10, and directs discharge port 105A of nozzle 105 toward the inside of his or her oral cavity.

In a fourth step, the user operates operation part 106 of washing unit 100 so that a washing liquid is discharged to the inside of his or her oral cavity from discharge port 105A. With such an operation, the inside of the oral cavity is washed with a washing liquid discharged from discharge port 105A.

In a fifth step, the user interrupts or finishes washing of his or her oral cavity using oral cavity washing device 1. Then, the user mounts washing unit 100 on body unit 10. In the fifth step, when the user interrupts washing of the inside of his or her oral cavity using oral cavity washing device 1, the user continues washing of the inside of his or her oral cavity by repeating the third step to the fifth step.

During such an operation, in a procedure that a washing liquid is discharged from discharge port 105A, a washing liquid discharged from pump 31 passes through the inside of tube 80. Accordingly, tube 80 vibrates by receiving water pressure of a washing liquid which flows through tube 80 and the like. Magnitude of vibrations of tube 80 depends on magnitude of water pressure of a washing liquid discharged from pump 31 as described above. Then, vibrating tube 80 is brought into contact with body unit 10.

Therefore, in oral cavity washing device 1 of this exemplary embodiment, elastic member 42 is mounted on arranging portion 40 with which tube 80 is likely to be brought into contact. Elastic member 42 absorbs vibrations of tube 80. Accordingly, abrasion of tube 80 minimally occurs. Further, noises generated by the contact between tube 80 and arranging portion 40 can be decreased.

In oral cavity washing device 1 of this exemplary embodiment, a two-dimensional shape of body unit 10 as viewed in a plan view is a circular shape, and a three-dimensional shape of body unit 10 is a circular columnar shape. Accordingly, also when tube 80 is brought into contact with body unit 10, a contact area between body unit 10 and tube 80 is narrowed. With such a configuration, even when pump 31 is driven, in a state where tube 80 is brought into contact with body unit 10, abrasion of tube 80 minimally occurs.

In oral cavity washing device 1 of this exemplary embodiment, in mounting washing unit 100 on body unit 10, when washing unit 100 is disposed close to body unit 10, washing unit 100 is joined to body unit 10 by a magnetic force of joining portion 110. Accordingly, even when washing unit 100 is not positionally aligned with body unit 10 accurately, washing unit 100 can be mounted on body unit 10 at a proper position.

Modification

The description relating to the exemplary embodiment is merely an example that the oral cavity washing device of the present disclosure can take, and does not intend to limit such a mode. The present disclosure can take, besides the exemplary embodiment, a following modification of the exemplary embodiment, and a mode obtained by combining at least two modifications which do not conflict with each other, for example.

Figure 15:
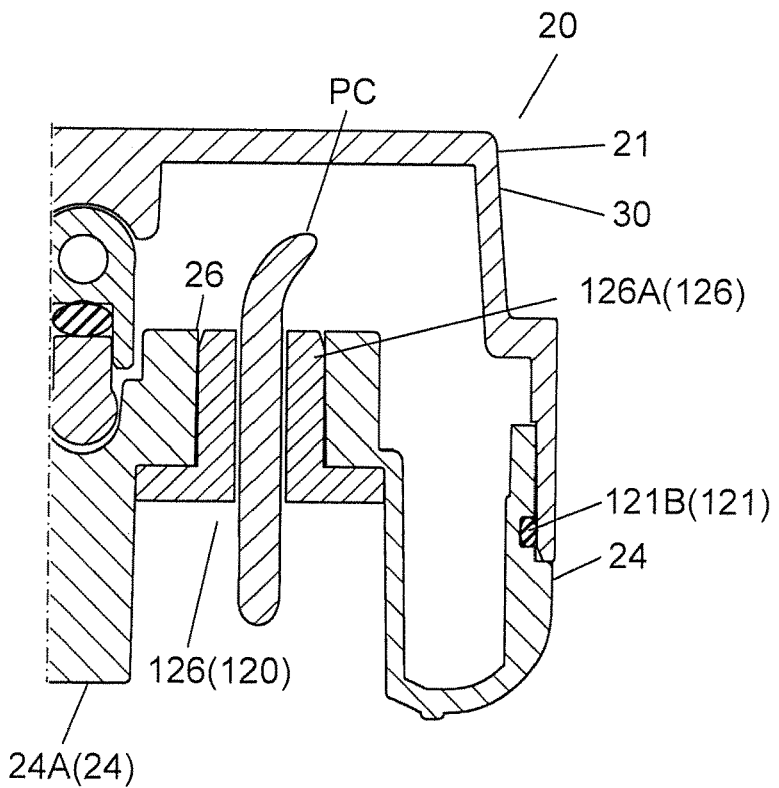
FIG. 15 is a cross-sectional view showing a sixth seal portion according to a modification.

For example, a configuration of sixth seal portion 126 can be arbitrarily changed. In a first example, as shown in FIG. 15, bushing 126A may be connected to lead-out portion 26 by ultrasonic welding, press-fitting or pressure bonding. With such a configuration, sealing is provided between bushing 126A and lead-out portion 26. In a second example, power source cord PC may be integrally formed with bottom lid 24. With such a configuration, sealing is provided between bottom lid 24 and power source cord PC.

A configuration of seal structure 120 shown in FIG. 9 can be arbitrarily changed. In a first example, first seal portion 121 can take a mode where at least one of first seal member 121A, second seal member 121B, and third seal member 121C is omitted. In a second example, second seal portion 122 can take a mode where at least one of first seal member 122A, second seal member 122B and third seal member 122C is omitted. In a third example, seal structure 120 shown in FIG. 5, FIG. 9, FIG. 11 and FIG. 12 can take a mode where at least one of first seal portion 121, second seal portion 122, third seal portion 123, fourth seal portion 124, fifth seal portion 125, and sixth seal portion 126 is omitted.

A two-dimensional shape of body unit 10 as viewed in a plan view in FIG. 3 can be arbitrarily changed. For example, a two-dimensional shape of body unit 10 as viewed in a plan view may be a shape including corners.

The relationship between upper surface 23A of device body 20 and upper surface 75A of tank 70 shown in FIG. 4 can be arbitrarily changed. In a first example, upper surface 23A of device body 20 may be set higher than upper surface 75A of tank 70. In a second example, upper surface 23A of device body 20 may be set lower than upper surface 75A of tank 70. In a third example, a portion of upper surface 75A of tank 70 may be configured to cover upper surface 23A of device body 20 such that upper surface 75A of tank 70 forms the whole upper surface of body unit 10. In a fourth example, a portion of upper surface 23A of device body 20 may be configured to cover upper surface 75A of tank 70 such that upper surface 23A of device body 20 forms the whole portion of an upper surface of body unit 10. In a fifth example, tank 70 may be detachably mounted on upper surface 23A of device body 20. As a relationship between upper surface 23A of device body 20 and upper surface 75A of tank 70, the relationship in a state where tank 70 is mounted on device body 20 is shown.

The relationship between first end surface 103A of second case 101 and upper surface 23A of device body 20 shown in FIG. 4 can be arbitrarily changed. In a first example, first end surface 103A may be set higher than upper surface 23A of device body 20. In a second example, first end surface 103A may be set lower than upper surface 23A of device body 20. As a relationship between first end surface 103A of second case 101 and upper surface 23A of device body 20, the relationship in a state where washing unit 100 is mounted on body unit 10 is shown.

The relationship between recessed portion 34 of case body 30 and recessed portion 41 of arranging portion 40 shown in FIG. 4 can be arbitrarily changed. For example, recessed portion 34 of case body 30 may be in a positionally displaced manner from recessed portion 41 of arranging portion 40 in a width direction of body unit 10. In such a case, second end portion 104 of second case 101 does not opposedly face arranging portion 40 in a state where washing unit 100 is mounted on body unit 10. The configuration where second end portion 104 of second case 101 does not opposedly face arranging portion 40 includes a configuration where a length of second case 101 is made short.

A configuration of elastic member 42 shown in FIG. 4 and FIG. 5 can be arbitrarily changed. In a first example, first elastic member 42A may be mounted on a portion of edge 41B of opening 41A. In a second example, second elastic member 42B may be mounted on a portion of inner peripheral surface 41C of recessed portion 41. In a third example, second elastic member 42B may be mounted on a portion of bottom surface 41D of recessed portion 41. In a fourth example, elastic member 42 can take a mode where at least one of first elastic member 42A and second elastic member 42B is omitted.

First outer wall 30A of case body 30 shown in FIG. 4 can take a mode where restricting portion 35 is omitted. In this case, in a state where washing unit 100 is mounted on body unit 10, the position of washing unit 100 with respect to body unit 10 is maintained only by a magnetic force of joining portion 110. Accordingly, first outer wall 101A of second case 101 can take a mode where contact portion 108 is omitted.

In recessed portion 34 shown in FIG. 4, whether or not magnet 111A is disposed in a vicinity of a center in height direction of recessed portion 34 can be arbitrarily changed. In a first example, in recessed portion 34, magnet 111A may be disposed on an upper side in a height direction of body unit 10. In a second example, in recessed portion 34, magnet 111A may be disposed on a lower side in a height direction of body unit 10.

Whether or not magnet 111A shown in FIG. 4 and FIG. 8 is disposed in first accommodating portion 111C can be arbitrarily changed. For example, magnet 111A may be disposed on an outer surface side of recessed portion 34. In such a case, first accommodating portion 111C can be omitted from first joining portion 111. Case body 30 can take a mode where recessed portion 34 is omitted.

Whether or not ferromagnetic 112A shown in FIG. 8 is disposed in second accommodating portion 112B can be arbitrarily changed. For example, ferromagnetic 112A may be disposed on an outer surface side of second case 101. In this case, second accommodating portion 112B can be omitted from second joining portion 112.

A relationship between thickness TA1 of second outer wall 30B of case body 30 and thicknesses TA2, TA3 of portions of first outer wall 30A of case body 30 around second outer wall 30B shown in FIG. 6 and FIG. 8 can be arbitrarily changed. In a first example, thickness TA1 may be set substantially equal to at least one of thicknesses TA2, TA3. In a second example, thickness TA1 may be set larger than at least one of thicknesses TA2, TA3.

A relationship between thickness TB1 of thin wall portion 101C of second outer wall 101B of second case 101 and thicknesses TB2, TB3 of portions of first outer wall 101A of second case 101 around second outer wall 101B shown in FIG. 6 and FIG. 8 can be arbitrarily changed. In a first example, thickness TB1 may be set substantially equal to at least one of thicknesses TB2, TB3. In a second example, thickness TB1 may be set larger than at least one of thicknesses TB2, TB3.

A configuration of joining portion 110 shown in FIG. 4 can be arbitrarily changed. In a first example, a configuration may be adopted where first joining portion 111 includes a ferromagnetic, and second joining portion 112 includes a magnet. In this case, a manufacturing cost can be reduced compared to a case where both first joining portion 111 and second joining portion 112 include a magnet. In a second example, a configuration may be adopted where first joining portion 111 includes magnet 111A, and second joining portion 112 includes a magnet such that the magnet and the magnet 111A attract to each other. In this case, the magnet included in joining portion 110 may be an electromagnet. In a third example, joining portion 110 may be configured to physically join body unit 10 and washing unit 100 to each other. In such a physical joint, one of first joining portion 111 and second joining portion 112 includes a hook, and the other of first joining portion 111 and second joining portion 112 includes a portion to be hooked which can be joined to the hook, for example. That is, oral cavity washing device 1 can take a mode where joining portion 110 of this exemplary embodiment is omitted.

Whether or not operation part 50 shown in FIG. 4 is to be disposed on upper surface 23A of device body 20 can be arbitrarily changed. For example, operation part 50 may be disposed on a side surface of device body 20.

Whether or not display part 60 shown in FIG. 4 is to be disposed on upper surface 23A of device body 20 can be arbitrarily changed. For example, display part 60 may be disposed on a side surface of device body 20. Oral cavity washing device 1 can take a mode where display part 60 is omitted.

Oral cavity washing device 200 according to the modification may include a following configuration which is described with reference to FIG. 16. Oral cavity washing device 200 of the modification differs from oral cavity washing device 1 of the exemplary embodiment with respect to a following point, and has substantially the same configuration as oral cavity washing device 1 of the exemplary embodiment with respect to other points. Here, components common to components of oral cavity washing device 1 according to the exemplary embodiment are given the same reference numerals to describe oral cavity washing device 200, and the description of the common components will be partially or entirely omitted.

Figure 16:
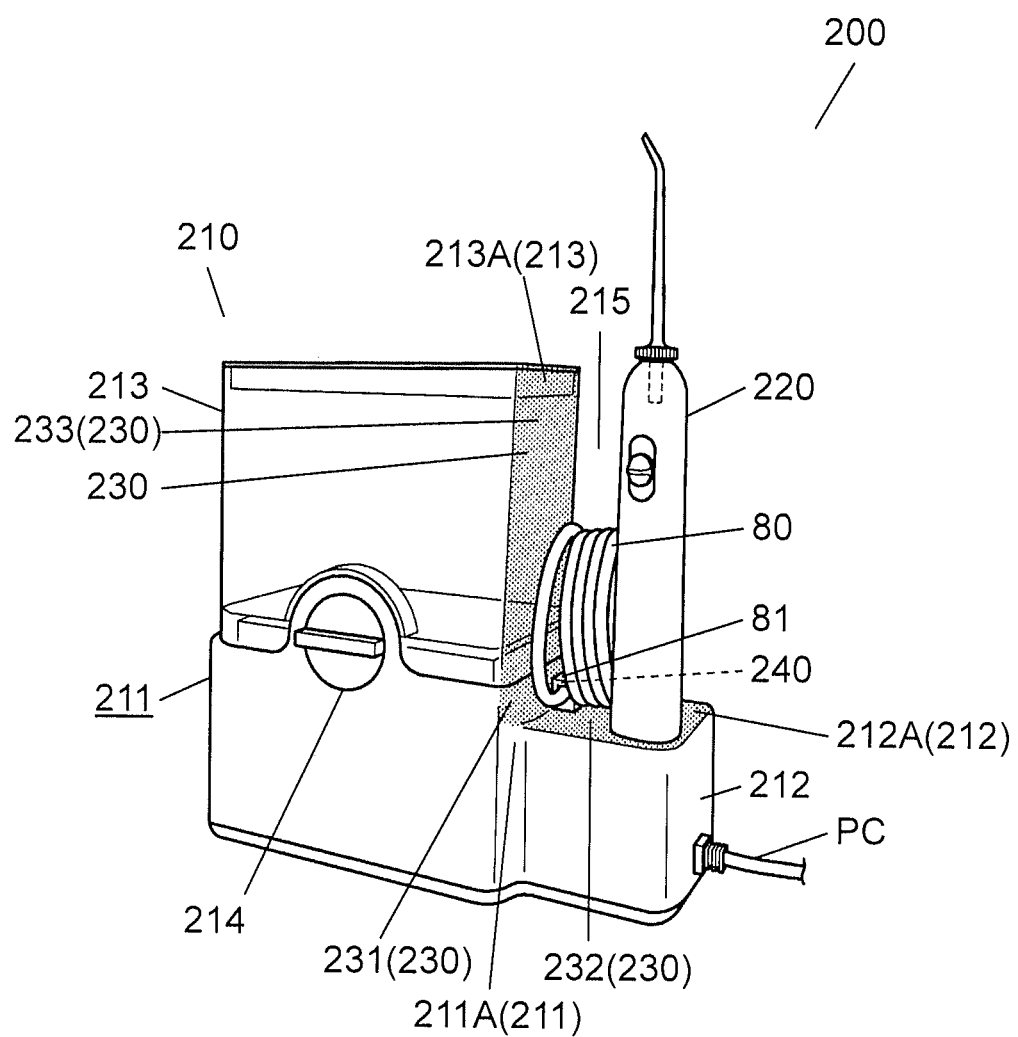
FIG. 16 is a perspective view showing one example of an oral cavity washing device according to the modification.

FIG. 16 is a perspective view showing one example of oral cavity washing device 200 according to the modification.

As shown in FIG. 16, oral cavity washing device 200 includes body unit 210, tube 80, washing unit 220, and power source cord PC. Body unit 210 includes device body 211, support base 212, tank 213, and operation part 214.

Configurations of device body 211, tank 213, operation part 214 and washing unit 220 are substantially equal to the configurations of device body 20, tank 70, operation part 50, and washing unit 100 according to the above-mentioned exemplary embodiment.

Tank 213 is detachably mounted on an upper portion of device body 211. Support base 212 is a base on which washing unit 220 is placed, and is integrally formed with device body 211. For example, when washing unit 220 is placed on support base 212, washing unit 220 and body unit 210 are joined to each other by a magnetic force.

Body unit 210 further includes arranging portion 215. Arranging portion 215 is mounted on body unit 210. In a state where washing unit 220 is mounted on body unit 210, tube 80 is arranged on arranging portion 215. For example, arranging portion 215 is formed of a portion surrounded by washing unit 220 placed on support base 212, side surface 211A of device body 211, upper surface 212A of support base 212, and side surface 213A of tank 213.

Oral cavity washing device 200 further includes elastic member 230. Elastic member 230 is disposed on a portion indicated by dots in FIG. 16. Elastic member 230 is made of an elastic material such as elastomer, for example, and hence, even when elastic member 230 is brought into contact with tube 80, tube 80 is minimally abraded. Elastic member 230 is mounted on arranging portion 215.

Elastic member 230 includes first elastic member 231, second elastic member 232, and third elastic member 233. First elastic member 231 is mounted on side surface 211A of device body 211. Second elastic member 232 is mounted on upper surface 212A of support base 212. Third elastic member 233 is mounted on side surface 213A of tank 213. That is, elastic member 230 is mounted on arranging portion 215 with which tube 80 is likely to be brought into contact. Accordingly, elastic member 230 absorbs vibrations of tube 80 which are generated at the time of operating oral cavity washing device 200. With such a configuration, generation of abrasion of tube 80 can be suppressed. Elastic member 230 can take a mode where one or two of the above-mentioned first elastic member 231, second elastic member 232, and third elastic member 233 is/are omitted.

Oral cavity washing device 200 further includes connecting portion 81, and elastic member 240. Connecting portion 81 is mounted on arranging portion 215. One example of elastic member 240 is an O ring. Elastic member 240 is mounted on arranging portion 215 so as to seal connecting portion 81. With such a configuration, an invasion of water into the inside of body unit 210 from connecting portion 81 can be prevented.

What is claimed is:

1. An oral cavity washing device comprising:
   a body unit including a tank which stores a washing liquid, a pump from which the washing liquid stored in the tank is discharged, and a case formed by joining a plurality of parts to each other so as to accommodate the pump;
   a tube connected to the body unit so as to make the discharged washing liquid flow through the tube;
   an operation part mounted on the case;
   a washing unit connected to the tube so as to discharge the washing liquid; and
   a seal structure having at least a first seal portion which seals a joint portion between two of the plurality of parts forming the case,
   wherein an upper surface of the case is positioned on substantially the same plane as an upper surface of the tank in a state where the tank is mounted on the case, the upper surface of the case forms a sealed member,
   the plurality of parts forming the case include a case body including an upper opening and a lower opening, an upper lid provided on the case body to close the upper opening, and a bottom lid provided on the lower opening to close the lower opening,
   the upper lid forms the upper surface of the case,
   the operation part is mounted on the upper surface of the case,
   the operation part includes an operation panel provided on the upper opening so as to be located under the upper lid,
   the first seal portion is provided between an outer peripheral portion of the operation panel and the case body, the first seal portion is sandwiched between the outer peripheral portion of the operation panel and the case body, and the first seal portion seals a joint portion between the upper lid and the case body,
   the seal structure further includes a second seal portion which seals a joint portion between the case and the operation part and forms a waterproof seal, and
   wherein the upper lid is fixed to the case body such that the upper lid is non-movable relative to the case body.

2. The oral cavity washing device according to claim 1, further comprising a connecting portion which connects the body unit and the tube to each other, wherein the seal structure further includes a third seal portion which seals a joint portion between the connecting portion and the body unit.

3. The oral cavity washing device according to claim 1, wherein
   the tank is detachably mounted on the case and includes an outlet through which the washing liquid is made to flow,
   the case includes a water supply port which is connected to the outlet of the tank, and
   the seal structure further includes a fourth seal portion which is mounted so as to seal the water supply port of the case.

4. The oral cavity washing device according to claim 1, further comprising a power source circuit which supplies power to the pump, wherein the seal structure further includes a fifth seal portion forming a waterproof layer which covers the power source circuit.

5. The oral cavity washing device according to claim 1, further comprising a power source circuit which supplies power to the pump, and a power source cord which supplies power to the power source circuit, wherein
   the case includes a lead-out portion through which the power source cord is led out from an inside of the case, and
   the seal structure further includes a sixth seal portion which provides sealing between the case and the power source cord in the lead-out portion.

6. The oral cavity washing device according to claim 5, wherein the sixth seal portion includes a bushing which is mounted on the power source cord so as to be inserted into the lead-out portion, and a seal member which provides sealing between the bushing and the lead-out portion.

7. The oral cavity washing device according to claim 1, the washing unit is detachably mounted on the front side of the case, the tank is detachably mounted at a position different from the washing unit of the case, and the tube is arranged on a recessed arranging portion.

8. The oral cavity washing device according to claim 7, wherein a two-dimensional shape of body unit is an elliptical shape as viewed in a plan view, the tank is detachably mounted on the rear side of the case, and the washing unit is mounted on a recessed portion which is disposed on the case.

* * * * *